US012704622B2

(12) United States Patent
Zhang et al.

(10) Patent No.: US 12,704,622 B2
(45) Date of Patent: Aug. 11, 2026

(54) LOCATION AS A SERVICE

(71) Applicant: QUALCOMM Incorporated, San Diego, CA (US)

(72) Inventors: Xiaoxin Zhang, Sunnyvale, CA (US); Sandip Homchaudhuri, San Jose, CA (US); James Simon Cho, Stateline, NV (US); Nicholas Kucharewski, San Jose, CA (US); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 18/296,549

(22) Filed: Apr. 6, 2023

(65) Prior Publication Data

US 2023/0333241 A1 Oct. 19, 2023

Related U.S. Application Data

(60) Provisional application No. 63/362,944, filed on Apr. 13, 2022.

(51) Int. Cl.
*G01S 13/87* (2006.01)
*H04L 43/0864* (2022.01)
*H04W 28/02* (2009.01)

(52) U.S. Cl.
CPC ........ *G01S 13/876* (2013.01); *H04L 43/0864* (2013.01); *H04W 28/0252* (2013.01)

(58) Field of Classification Search
CPC ...... G01S 13/876; G01S 7/006; G01S 13/765; G01S 13/878; H04L 43/0864; H04L 41/0893; H04L 41/12; H04W 28/0252
See application file for complete search history.

(56) References Cited

U.S. PATENT DOCUMENTS

2014/0335891 A1* 11/2014 Zhang ................. H04W 64/003 455/456.1
2014/0365488 A1 12/2014 Arslan et al.
(Continued)

FOREIGN PATENT DOCUMENTS

CN 107370808 A 11/2017
WO WO-2017087118 A1 5/2017
WO WO-2021026509 A1 2/2021

OTHER PUBLICATIONS

Partial International Search Report—PCT/US2023/017898—ISA/EPO—Jul. 12, 2023.

(Continued)

*Primary Examiner* — Abdullahi E Salad
(74) *Attorney, Agent, or Firm* — Harrity & Harrity, LLP

(57) ABSTRACT

Various aspects of the present disclosure generally relate to wireless communication. In some aspects, a network node may transmit an indication of a media access control (MAC) address associated with an access point to a group of access points included in a network. The network node may receive single-sided round-trip-time (RTT) data associated with a user device associated with the access point, wherein the single-sided RTT data is received from each of the group of access points based at least in part on transmitting the indication of the MAC address to the group of access points. The network node may determine a location of the user device based at least in part on the single-sided RTT data. The network node may transmit an indication of the location of the user device to the access point. Numerous other aspects are described.

20 Claims, 16 Drawing Sheets

(56) References Cited

U.S. PATENT DOCUMENTS

| | | | | |
|---|---|---|---|---|
| 2018/0292522 | A1 | 10/2018 | Cavendish et al. | |
| 2019/0230519 | A1* | 7/2019 | Xu | H04W 64/00 |
| 2021/0076163 | A1 | 3/2021 | Burowski et al. | |
| 2021/0306979 | A1* | 9/2021 | Choi | H04L 5/005 |
| 2022/0026551 | A1* | 1/2022 | Park | G01S 13/723 |
| 2022/0070883 | A1* | 3/2022 | Choi | H04B 7/06952 |
| 2022/0109466 | A1 | 4/2022 | Manolakos et al. | |
| 2022/0322263 | A1* | 10/2022 | Sengupta | H04W 56/004 |
| 2023/0318673 | A1* | 10/2023 | Pezeshki | G01S 1/08 375/262 |
| 2024/0137899 | A1* | 4/2024 | Thomas | H04W 64/00 |
| 2024/0251374 | A1* | 7/2024 | Wei | H04W 64/00 |

OTHER PUBLICATIONS

International Search Report and Written Opinion—PCT/US2023/017898—ISA/EPO—Oct. 20, 2023.

* cited by examiner

800

900

LOCATION AS A SERVICE

CROSS-REFERENCE TO RELATED APPLICATION

This Patent Application claims priority to U.S. Provisional Patent Application No. 63/362,944, filed on Apr. 13, 2022, entitled "LOCATION AS A SERVICE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for providing location as a service.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting an indication of a media access control (MAC) address associated with an access point to a group of access points included in a network. The method may include receiving single-sided round-trip-time (RTT) data associated with a user device associated with the access point, where the single-sided RTT data is received from each of the group of access points based at least in part on transmitting the indication of the MAC address to the group of access points. The method may include determining a location of the user device based at least in part on the single-sided RTT data. The method may include transmitting an indication of the location of the user device to the access point.

Some aspects described herein relate to a method of wireless communication performed by a network node. The method may include receiving an indication of a MAC address associated with another network node. The method may include transmitting a message to a user device, where the message includes the MAC address of the other network node. The method may include receiving a response from the user device. The method may include transmitting single-sided RTT data to a control device, where the single-sided RTT data is determined based at least in part on transmitting the message and receiving the response.

Some aspects described herein relate to a method of wireless communication performed by a network node. The method may include transmitting channel sweeping data to an access point included in a network, where the channel sweeping data indicates one or more frequency bands and one or more channels. The method may include receiving channel estimation data and one or more time stamps associated with the channel estimation data. The method may include transmitting location information associated with a user device, where the location information is determined based at least in part on performing a channel stitching process, and where the channel stitching process is performed based at least in part the channel estimation data and the one or more time stamps.

Some aspects described herein relate to a method of wireless communication performed by a network node. The method may include receiving channel sweeping data from a control device included in a network, where the channel sweeping data indicates one or more frequency bands and one or more channels. The method may include transmitting channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The method may include receiving location information associated with the user device based at least in part on transmitting the channel estimation data and the one or more time stamps.

Some aspects described herein relate to a method of wireless communication performed by a network node. The method may include receiving an indication of a ranging capability associated with an access point. The method may include transmitting an indication of a ranging technology for determining location information associated with a user device, where the ranging technology is selected from a plurality of ranging technologies based at least in part on the ranging capability associated with the access point.

Some aspects described herein relate to a network node for wireless communication. The network node may include a memory and one or more processors coupled to the memory. The one or more processors may be configured to transmit an indication of a MAC address associated with an access point to a group of access points included in a network. The one or more processors may be configured to receive single-sided RTT data associated with a user device associated with the access point, where the single-sided RTT data is received from each of the group of access points based at least in part on transmitting the indication of the MAC address to the group of access points. The one or more processors may be configured to determine a location of the user device based at least in part on the single-sided RTT data. The one or more processors may be configured to transmit an indication of the location of the user device to the access point.

Some aspects described herein relate to a network node for wireless communication. The network node may include a memory and one or more processors coupled to the memory. The one or more processors may be configured to receive an indication of a MAC address associated with another network node. The one or more processors may be configured to transmit a message to a user device, where the message includes the MAC address of the other network node. The one or more processors may be configured to receive a response from the user device. The one or more processors may be configured to transmit single-sided RTT data to a control device, where the single-sided RTT data is determined based at least in part on transmitting the message and receiving the response.

Some aspects described herein relate to a network node for wireless communication. The network node may include a memory and one or more processors coupled to the memory. The one or more processors may be configured to transmit channel sweeping data to an access point included in a network, where the channel sweeping data indicates one or more frequency bands and one or more channels. The one or more processors may be configured to receive channel estimation data and one or more time stamps associated with the channel estimation data. The one or more processors may be configured to transmit location information associated with a user device, where the location information is determined based at least in part on performing a channel stitching process, and where the channel stitching process is performed based at least in part the channel estimation data and the one or more time stamps.

Some aspects described herein relate to a network node for wireless communication. The network node may include a memory and one or more processors coupled to the memory. The one or more processors may be configured to receive channel sweeping data from a control device included in a network, where the channel sweeping data indicates one or more frequency bands and one or more channels. The one or more processors may be configured to transmit channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The one or more processors may be configured to receive location information associated with the user device based at least in part on transmitting the channel estimation data and the one or more time stamps.

Some aspects described herein relate to a network node for wireless communication. The network node may include a memory and one or more processors coupled to the memory. The one or more processors may be configured to receive an indication of a ranging capability associated with an access point. The one or more processors may be configured to transmit an indication of a ranging technology for determining location information associated with a user device, where the ranging technology is selected from a plurality of ranging technologies based at least in part on the ranging capability associated with the access point.

Some aspects described herein relate to a non-transitory computer-readable medium that stores a set of instructions for wireless communication by a network node. The set of instructions, when executed by one or more processors of the network node, may cause the network node to transmit an indication of a MAC address associated with an access point to a group of access points included in a network. The set of instructions, when executed by one or more processors of the network node, may cause the network node to receive single-sided RTT data associated with a user device associated with the access point, where the single-sided RTT data is received from each of the group of access points based at least in part on transmitting the indication of the MAC address to the group of access points. The set of instructions, when executed by one or more processors of the network node, may cause the network node to determine a location of the user device based at least in part on the single-sided RTT data. The set of instructions, when executed by one or more processors of the network node, may cause the network node to transmit an indication of the location of the user device to the access point.

Some aspects described herein relate to a non-transitory computer-readable medium that stores a set of instructions for wireless communication by a network node. The set of instructions, when executed by one or more processors of the network node, may cause the network node to receive an indication of a MAC address associated with another network node. The set of instructions, when executed by one or more processors of the network node, may cause the network node to transmit a message to a user device, where the message includes the MAC address of the other network node. The set of instructions, when executed by one or more processors of the network node, may cause the network node to receive a response from the user device. The set of instructions, when executed by one or more processors of the network node, may cause the network node to transmit single-sided RTT data to a control device, where the single-sided RTT data is determined based at least in part on transmitting the message and receiving the response.

Some aspects described herein relate to a non-transitory computer-readable medium that stores a set of instructions for wireless communication by a network node. The set of instructions, when executed by one or more processors of the network node, may cause the network node to transmit channel sweeping data to an access point included in a network, where the channel sweeping data indicates one or more frequency bands and one or more channels. The set of instructions, when executed by one or more processors of the network node, may cause the network node to receive channel estimation data and one or more time stamps associated with the channel estimation data. The set of instructions, when executed by one or more processors of the network node, may cause the network node to transmit location information associated with a user device, where the location information is determined based at least in part on performing a channel stitching process, and where the channel stitching process is performed based at least in part the channel estimation data and the one or more time stamps.

Some aspects described herein relate to a non-transitory computer-readable medium that stores a set of instructions for wireless communication by a network node. The set of instructions, when executed by one or more processors of the network node, may cause the network node to receive channel sweeping data from a control device included in a network, where the channel sweeping data indicates one or more frequency bands and one or more channels. The set of instructions, when executed by one or more processors of the network node, may cause the network node to transmit channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The set of instructions, when executed by one or more processors of the network node, may cause the network node to receive location information associated with the user device based at least in part on transmitting the channel estimation data and the one or more time stamps.

Some aspects described herein relate to a non-transitory computer-readable medium that stores a set of instructions for wireless communication by a network node. The set of instructions, when executed by one or more processors of the network node, may cause the network node to receive an indication of a ranging capability associated with an access point. The set of instructions, when executed by one or more processors of the network node, may cause the network node to transmit an indication of a ranging technology for determining location information associated with a user device, where the ranging technology is selected from a plurality of ranging technologies based at least in part on the ranging capability associated with the access point.

Some aspects described herein relate to an apparatus for wireless communication. The apparatus may include means for transmitting an indication of a MAC address associated with an access point to a group of access points included in a network. The apparatus may include means for receiving single-sided RTT data associated with a user device associated with the access point, where the single-sided RTT data is received from each of the group of access points based at least in part on transmitting the indication of the MAC address to the group of access points. The apparatus may include means for determining a location of the user device based at least in part on the single-sided RTT data. The apparatus may include means for transmitting an indication of the location of the user device to the access point.

Some aspects described herein relate to an apparatus for wireless communication. The apparatus may include means for receiving an indication of a MAC address associated with another network node. The apparatus may include means for transmitting a message to a user device, where the message includes the MAC address of the other network node. The apparatus may include means for receiving a response from the user device. The apparatus may include means for transmitting single-sided RTT data to a control device, where the single-sided RTT data is determined based at least in part on transmitting the message and receiving the response.

Some aspects described herein relate to an apparatus for wireless communication. The apparatus may include means for transmitting channel sweeping data to an access point included in a network, where the channel sweeping data indicates one or more frequency bands and one or more channels. The apparatus may include means for receiving channel estimation data and one or more time stamps associated with the channel estimation data. The apparatus may include means for transmitting location information associated with a user device, where the location information is determined based at least in part on performing a channel stitching process, and where the channel stitching process is performed based at least in part the channel estimation data and the one or more time stamps.

Some aspects described herein relate to an apparatus for wireless communication. The apparatus may include means for receiving channel sweeping data from a control device included in a network, where the channel sweeping data indicates one or more frequency bands and one or more channels. The apparatus may include means for transmitting channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The apparatus may include means for receiving location information associated with the user device based at least in part on transmitting the channel estimation data and the one or more time stamps.

Some aspects described herein relate to an apparatus for wireless communication. The apparatus may include means for receiving an indication of a ranging capability associated with an access point. The apparatus may include means for transmitting an indication of a ranging technology for determining location information associated with a user device, where the ranging technology is selected from a plurality of ranging technologies based at least in part on the ranging capability associated with the access point.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
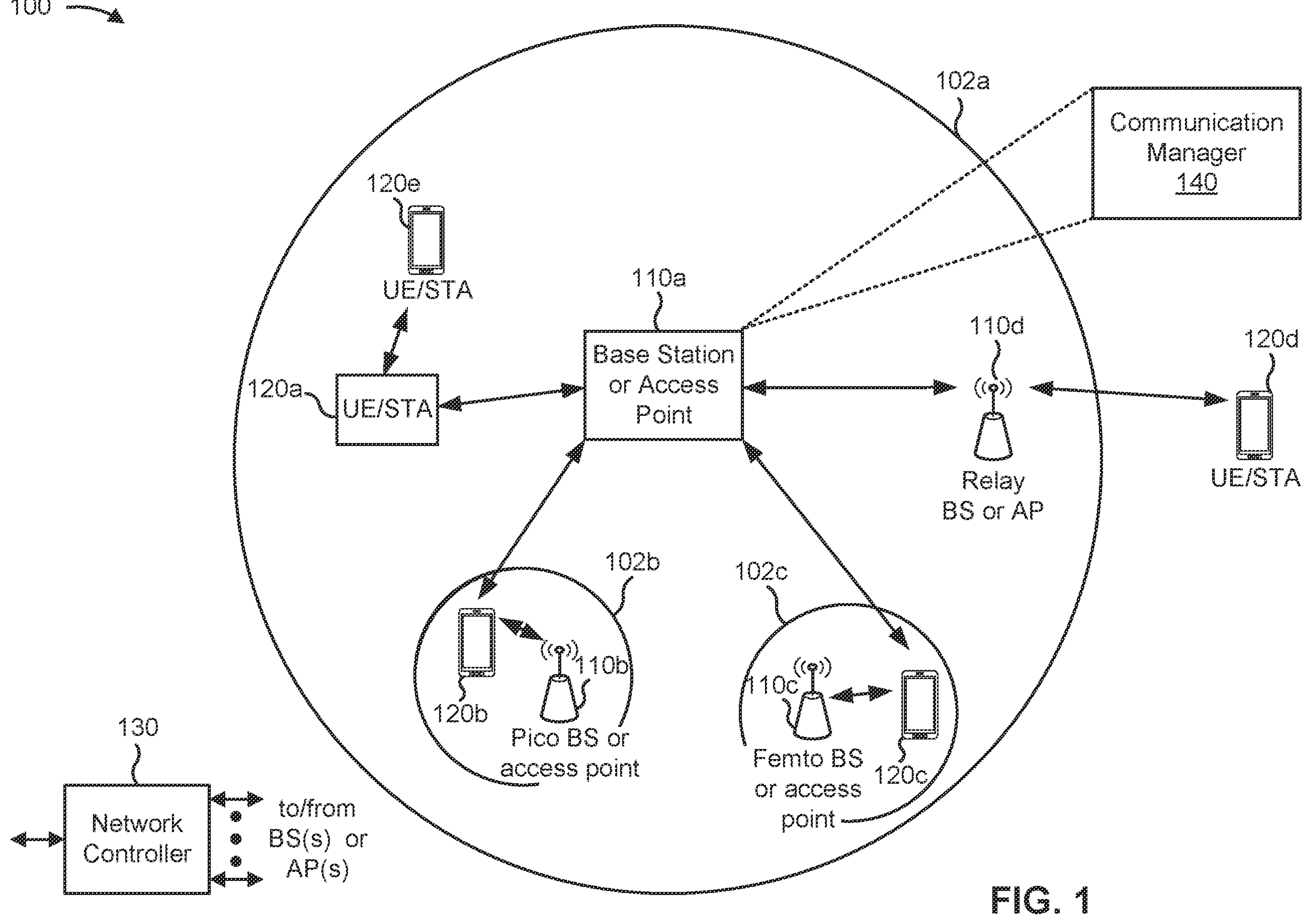
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network, a 4G (e.g., Long Term Evolution (LTE)) network, wide area network (WAN) access points (APs), personal area network (PAN) access points, ultra-wideband (UWB) access points, among other examples. The wireless network 100 may include a user equipment (UE) or station (STA) 120 or multiple UEs or STAs 120 (shown as a UE or STA 120*a*, a UE or STA 120*b*, a UE or STA 120*c*, a UE or STA 120*d*, and a UE 120*e*). The wireless network 100 may also include one or more network entities, such as a base station or access point 110 (shown as BS or AP 110*a*, pico BS or AP 110*b*, femto BS or AP 110*c*, and relay BS or AP 110*d*) and/or other network entities. A base station or AP 110 is a network node that communicates with UEs or STAs 120. A base station or AP 110 (sometimes referred to as a BS) may include, for example, an NR base station, an LTE base station, a Node B, an eNB (e.g., in 4G), a gNB (e.g., in 5G), a WAN AP, a PAN AP, and/or a transmission reception point (TRP). Each base station or AP 110 may provide communication coverage for a particular geographic area. The term "cell" can refer to a coverage area of a base station or AP 110, an access point, and/or a base station subsystem serving this coverage area, depending on the context in which the term is used.

A base station or AP 110 may provide communication coverage for a macro cell, a pico cell, a femto cell, and/or another type of cell. A macro cell may cover a relatively large geographic area (e.g., several kilometers in radius) and may allow unrestricted access by UEs or STAs 120 with service subscriptions. A pico cell may cover a relatively small geographic area and may allow unrestricted access by UEs or STAs 120 with service subscription. A femto cell may cover a relatively small geographic area (e.g., a home) and may allow restricted access by UEs or STAs 120 having association with the femto cell (e.g., UEs or STAs 120 in a closed subscriber group (CSG)). A base station 110 for a macro cell may be referred to as a macro base station. A base station 110 for a pico cell may be referred to as a pico base station. A base station or AP 110 for a femto cell may be referred to as a femto base station or an in-home base station. In the example shown in FIG. 1, the BS or AP 110*a* may be a macro base station or AP for a macro cell 102*a*, the BS or AP 110*b* may be a pico base station or AP for a pico cell 102*b*, and the BS or AP 110*c* may be a femto base station or AP for a femto cell 102*c*. A base station may support one or multiple (e.g., three) cells.

In some examples, a cell may not necessarily be stationary, and the geographic area of the cell may move according to the location of a base station or AP 110 that is mobile (e.g., a mobile base station). In some examples, the base stations or APs 110 may be interconnected to one another and/or to one or more other base stations or APs 110 or network nodes (not shown) in the wireless network 100 through various types of backhaul interfaces, such as a direct physical connection or a virtual network, using any suitable transport network.

In some aspects, the term "base station" or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the base station or AP 110. In some aspects, the term "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations and/or one or more virtual base station functions. For example, in some aspects, two or more base station functions may be instantiated on a single device. In some aspects, the term "base station" or "network node" may refer to one of the base station functions and not another. In this way, a single device may include more than one base station. A WAN access point, a PAN access point, or an UWB access point may also be referred to as a "network node." A network node may include components described for the base station or AP 110.

The wireless network 100 may include one or more relay stations. A relay station is an entity that can receive a transmission of data from an upstream station (e.g., a network node or a UE or STA 120) and send a transmission of the data to a downstream station (e.g., a UE or STA 120 or a network node). A relay station may be a UE or STA 120 that can relay transmissions for other UEs or STAs 120. In the example shown in FIG. 1, the BS or AP 110*d* (e.g., a relay base station, access point) may communicate with the BS or AP 110*a* (e.g., a macro base station, access point) and the UE or STA 120*d* in order to facilitate communication between the BS or AP 110*a* and the UE or STA 120*d*. A base station that relays communications may be referred to as a relay station, a relay base station, a relay, or the like.

The wireless network 100 may be a heterogeneous network with network nodes that include base stations or APs 110 of different types, such as macro base stations, pico base stations, femto base stations, relay base stations, or the like. These different types of base stations or APs 110 may have different transmit power levels, different coverage areas, and/or different impacts on interference in the wireless network 100. For example, macro base stations or APs may have a high transmit power level (e.g., 5 to 40 watts) whereas pico base stations or APs, femto base stations or APs, and relay base stations may have lower transmit power levels (e.g., 0.1 to 2 watts).

A network controller 130 may couple to or communicate with a set of network nodes and may provide coordination and control for these network nodes. The network controller 130 may communicate with the base stations or APs 110 via a backhaul communication link. The network nodes may communicate with one another directly or indirectly via a wireless or wireline backhaul communication link.

The UEs or STAs 120 may be dispersed throughout the wireless network 100, and each UE or STA 120 may be stationary or mobile. A UE or STA 120 may include, for example, an access terminal, a terminal, a mobile station, and/or a subscriber unit. A UE or STA 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs or STAs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs or STAs 120 may be considered Internet-of-Things (IoT) devices, and/or may be implemented as NB-IoT (narrowband IoT) devices. Some UEs or STAs 120 may be considered a Customer Premises Equipment. A UE or STA 120 may be included inside a housing that houses components of the UE or STA 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs or STAs 120 (e.g., shown as UE or STA 120*a* and UE or STA 120*e*) may communicate directly using one or more sidelink channels (e.g., without using a base station 110 as an intermediary to communicate with one another). For example, the UEs or STAs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE or STA 120 may perform scheduling operations, resource selection operations, and/or other operations described elsewhere herein as being performed by the base station or AP 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 140. As described in more detail elsewhere herein, the communication manager 140 may perform one or more operations associated with providing location as a service. Additionally, or alternatively, the communication manager 140 may perform one or more other operations described herein.

More specifically, in some aspects, a network node (e.g., base station 110) may include a communication manager 140. As described in more detail elsewhere herein, the communication manager 140 may transmit an indication of a media access control (MAC) address associated with an access point to a group of access points included in a network. The communication manager 140 may receive single-sided round-trip-time (RTT) data associated with a user device associated with the access point, where the single-sided RTT data is received from each of the group of access points based at least in part on transmitting the indication of the MAC address to the group of access points. The communication manager 140 may determine a location of the user device based at least in part on the single-sided RTT data. The communication manager 140 may transmit an indication of the location of the user device to the access point.

In some aspects, the communication manager 140 may receive an indication of a MAC address associated with another network node. The communication manager 140 may transmit a message to a user device, where the message includes the MAC address of the other network node. The communication manager 140 may receive a response from the user device. The communication manager 140 may transmit single-sided RTT data to a control device, where the single-sided RTT data is determined based at least in part on transmitting the message and receiving the response.

In some aspects, the communication manager 140 may transmit channel sweeping data to an access point included in a network, where the channel sweeping data indicates one or more frequency bands and one or more channels. The communication manager 140 may receive channel estimation data and one or more time stamps associated with the channel estimation data. The communication manager 140 may transmit location information associated with a user device, where the location information is determined based at least in part on performing a channel stitching process, and where the channel stitching process is performed based at least in part on the channel estimation data and the one or more time stamps.

In some aspects, the communication manager 140 may receive channel sweeping data from a control device included in a network, where the channel sweeping data indicates one or more frequency bands and one or more channels. The communication manager 140 may transmit channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The communication manager 140 may receive location information associated with the user device based at least in part on transmitting the channel estimation data and the one or more time stamps.

In some aspects, the communication manager 140 may receive an indication of a ranging capability associated with an access point. The communication manager 140 may transmit an indication of a ranging technology for determining location information associated with a user device, where the ranging technology is selected from a plurality of ranging technologies based at least in part on the ranging capability associated with the access point.

As described herein, a node, which may be referred to as a "node," a "network node," or a "wireless node," may be a base station (e.g., base station 110), an access point (e.g., AP 110) a UE (e.g., UE or STA 120), a station, a relay device, a network controller, an apparatus, a device, a computing system, one or more components of any of these, and/or another processing entity configured to perform one or more aspects of the techniques described herein. For example, a network node may be a UE or a station. As another example, a network node may be a base station or an access point. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, station, base station, access point, apparatus, device, computing system, or the like may include disclosure of the UE, station, base station, access point, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, first station, a first base station, a first access point, a first apparatus, a first device, a first computing system, a first one or more components, a first processing entity, or the like configured to receive the information from the second network; and "second network node" may refer to a second UE, a second station, a second base station, a second access point, a second apparatus, a second device, a second computing system, a second one or more components, a second processing entity, or the like.

As indicated above, FIG. 1 is provided as an example. Other examples may differ from what is described with regard to FIG. 1.

Figure 2:
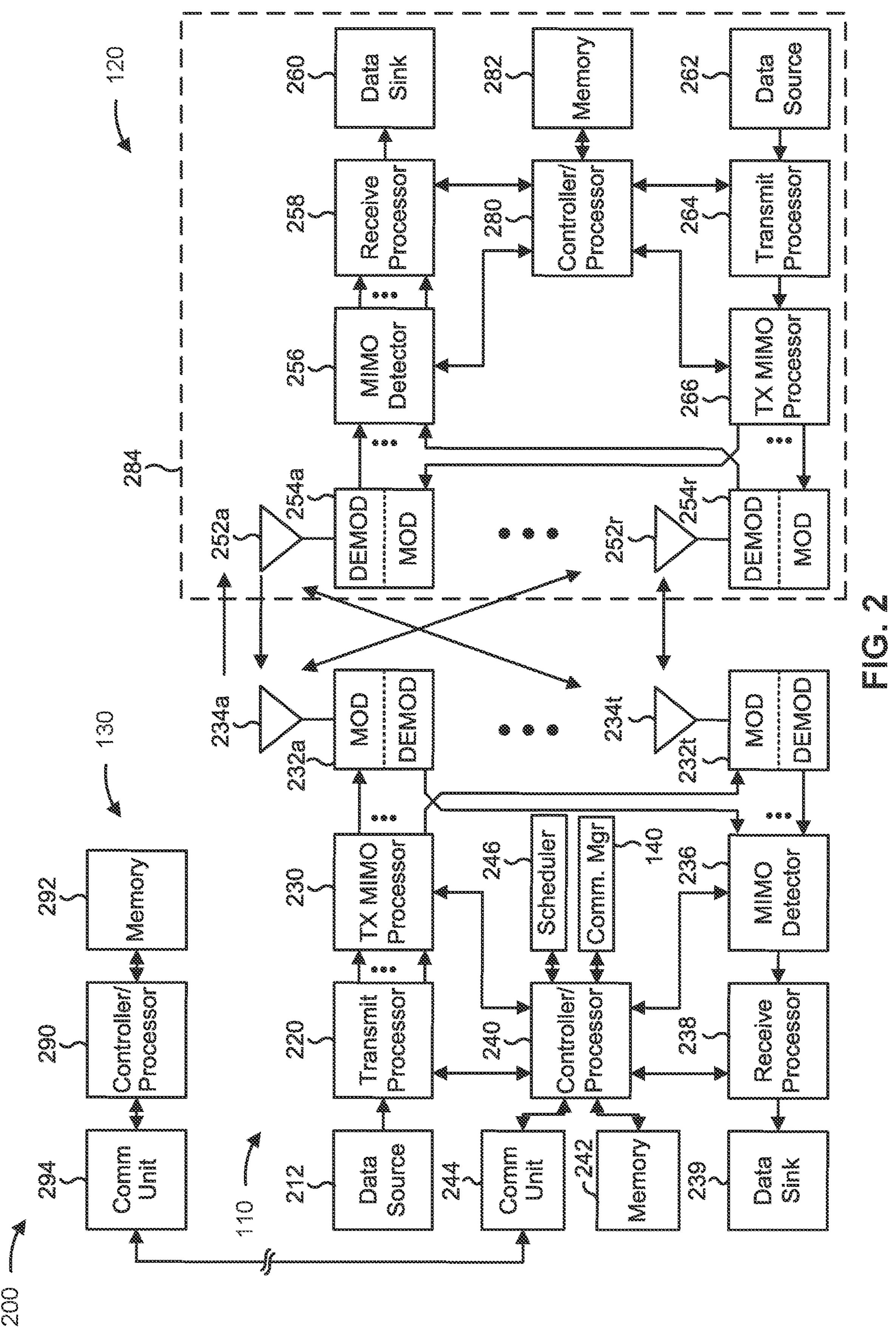
FIG. 2 is a diagram illustrating an example of a base station in communication with a user equipment (UE) in a wireless network, in accordance with the present disclosure.

FIG. 2 is a diagram illustrating an example 200 of a network node (e.g., base station or AP 110) in communication with a UE or STA 120 in a wireless network 100, in accordance with the present disclosure. The base station or AP 110 may be equipped with a set of antennas 234*a* through 234*t*, such as T antennas (T≥1). The UE or STA 120 may be equipped with a set of antennas 252*a* through 252*r*, such as R antennas (R≥1).

At the base station or AP 110, a transmit processor 220 may receive data, from a data source 212, intended for the UE or STA 120 (or a set of UEs or STAs 120). The transmit processor 220 may select one or more modulation and coding schemes (MCSs) for the UE or STA 120 based at least in part on one or more channel quality indicators (CQIs) received from that UE or STA 120. The base station or AP 110 may process (e.g., encode and modulate) the data for the UE or STA 120 based at least in part on the MCS(s) selected for the UE or STA 120 and may provide data symbols for the UE or STA 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE or STA 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE or STA 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE or STA 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE or STA 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE or STA 120 may include a modulator and a demodulator. In some examples, the UE or STA 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-16).

At the base station 110, the uplink signals from UE or STA 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE or STA 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs or STAs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-16).

The controller/processor 240 of the base station or AP 110, the controller/processor 280 of the UE or STA 120, and/or any other component(s) of FIG. 2 may perform one or more techniques associated with providing location as a service, as described in more detail elsewhere herein. For example, the controller/processor 240 of the base station or AP 110, the controller/processor 280 of the UE or STA 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, and/or other processes as described herein. The memory 242 and the memory 282 may store data and program codes for the base station or AP 110 and the UE or STA 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE or STA 120, may cause the one or more processors, the UE or STA 120, and/or the base station or AP 110 to perform or direct operations of, for example, process 700 of FIG. 7, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a network node (e.g., base station 110) includes means for transmitting an indication of a media access control (MAC) address associated with an access point to a group of access points included in a network; means for receiving single-sided round-trip-time (RTT) data associated with a user device associated with the access point, where the single-sided RTT data is received from each of the group of access points based at least in part on transmitting the indication of the MAC address to the group of access points; means for determining a location of the user device based at least in part on the single-sided RTT data; and/or means for transmitting an indication of the location of the user device to the access point. In some aspects, the means for the network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, a network node (e.g., base station 110) includes means for receiving an indication of a MAC address associated with another network node; means for transmitting a message to a user device, where the message includes the MAC address of the other network node; means for receiving a response from the user device; and/or means for transmitting single-sided RTT data to a control device, where the single-sided RTT data is determined based at least in part on transmitting the message and receiving the response. In some aspects, the means for the network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, a network node (e.g., base station 110) includes means for transmitting channel sweeping data to an access point included in a network, where the channel sweeping data indicates one or more frequency bands and one or more channels; means for receiving channel estimation data and one or more time stamps associated with the channel estimation data; and/or means for transmitting location information associated with a user device, where the location information is determined based at least in part on performing a channel stitching process, and where the channel stitching process is performed based at least in part the channel estimation data and the one or more time stamps. In some aspects, the means for the network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, a network node (e.g., base station 110) includes means for receiving channel sweeping data from a control device included in a network, where the channel sweeping data indicates one or more frequency bands and one or more channels; means for transmitting channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data; and/or means for receiving location information associated with the user device based at least in part on transmitting the channel estimation data and the one or more time stamps. In some aspects, the means for the network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, a network node (e.g., base station 110) includes means for receiving an indication of a ranging capability associated with an access point; and/or means for transmitting an indication of a ranging technology for determining location information associated with a user device, where the ranging technology is selected from a plurality of ranging technologies based at least in part on the ranging capability associated with the access point. In some aspects, the means for the network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
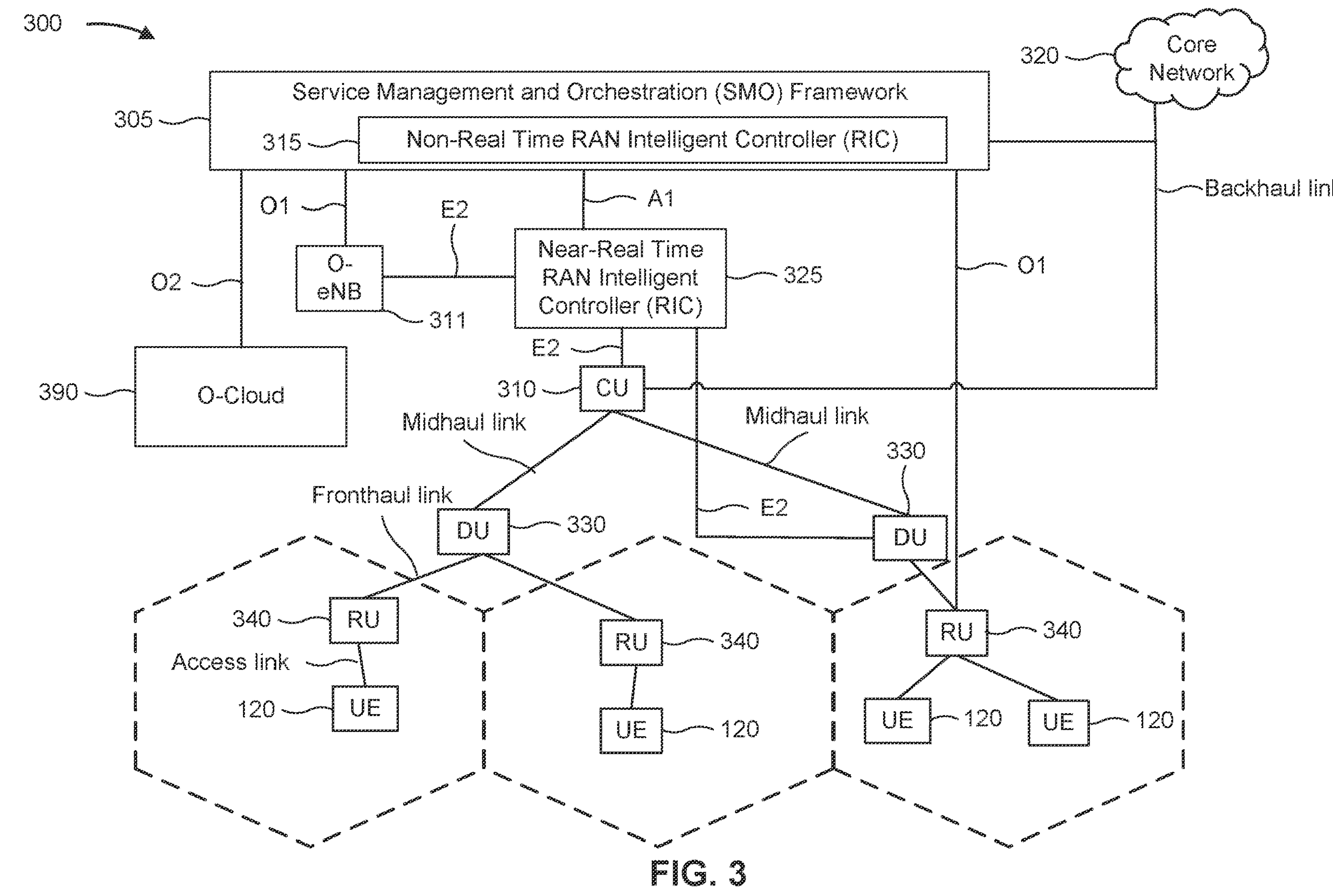
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, an AP, a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs or STAs 120 via one or more radio frequency (RF) access links. In some implementations, the UE or STA 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs or STAs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Commonly, over-the-air (OTA) decisions (e.g., location protocol selection, protocol parameters selection, location channel scheduling, or transmission opportunity (TXOP) management, among other examples) are implemented in hardware and/or firmware. Implementing OTA decisions in hardware and/or firmware may enable just-in-time decision making related to channel selection and/or optimized service goals within the window of a TXOP or a frame exchange sequence.

However, implementing OTA decisions in hardware and/or firmware may prevent the OTA decisions from being made in view of various conditions and/or considerations, such as a status of a network queue, peer device capabilities, use case dependent performance goals, and/or operator specified coordinated location ranging across multiple access points, among other examples.

Some techniques and apparatuses described herein enable a network node to provide location as a service. In some aspects, as described in greater detail elsewhere herein, tiered communication loops may be implemented within a wireless network. A first communication loop may include communications between a central controller device (e.g., a network node acting as a central controller device within a network) and a resource management component of a network node. The first communication loop may include a slow loop that involves conveying intent via decision-boundary knobs, a peer device turnaround time estimation (across multiple APs), multi-channel stitching, location network resource allocation, location tracking and navigation, and/or advanced telemetry for a cloud-based controller leading to machine learning driven inferences. A second communication loop may include communications between the resource management component and a firmware layer of the network node. The second communication loop may include a mid-speed loop that involves algorithms acting on telemetry and slow loop decision boundaries, MAC address spoofing, channel sweeping, location protocol selection, and/or parameter selection. A third communication loop may include communications between the firmware layer of the network node and a hardware layer of the network node. The third communication loop may include a fast loop that involves hyper-fast loops of execution at transmission opportunity resolution, location frames transmission and reception, timestamp estimation, timing corrections, and/or spatial diversity ranging. As a result, a central controller device can communicate OTA decisions that are based at least in part on a holistic view of the current conditions of network, specific use case performance goals, and/or capabilities of devices included in the network to a network node via the first communication loop while enabling implementation to occur utilizing the speed associated with communications occurring via the third communication loop (e.g., via the firmware and/or hardware layer).

Tiered loops of control may enable the delivery of location as a software service (end-to-end). Tiered loops of control may provide a framework for fast-loop innovation such as improved accuracy via advanced signal processing algorithms, switched diversity ranging, and higher channel bandwidth operations. The framework for a mid-loop presence enables coordinated ranging across bands of AP within the single AP (appears to the ranged device as requests emanating from same physical AP). The framework for slow-loop may involve a turnaround time estimation (for single sided RTT) that can be done by triangulation over multiple AP and/or coordinated AP ranging.

In some aspects, a slow loop may use location network resource allocation (which APs to range with which STA at what time and order), peer device turnaround time estimation, and/or location tracking and navigation. A mid-loop may use MAC address spoofing, a channel change, location protocol selection (e.g., single-sided RTT, quality of service (QoS) null scheduling), and/or protocol parameters selection (e.g., number of frames per burst, time gap between frames). The fast loop may change to a STA channel, transmit QoS null frames with a spoofed MAC address, receive an acknowledgement (ACK), and/or capture and report the time of departure and the time of arrival.

Figure 4:
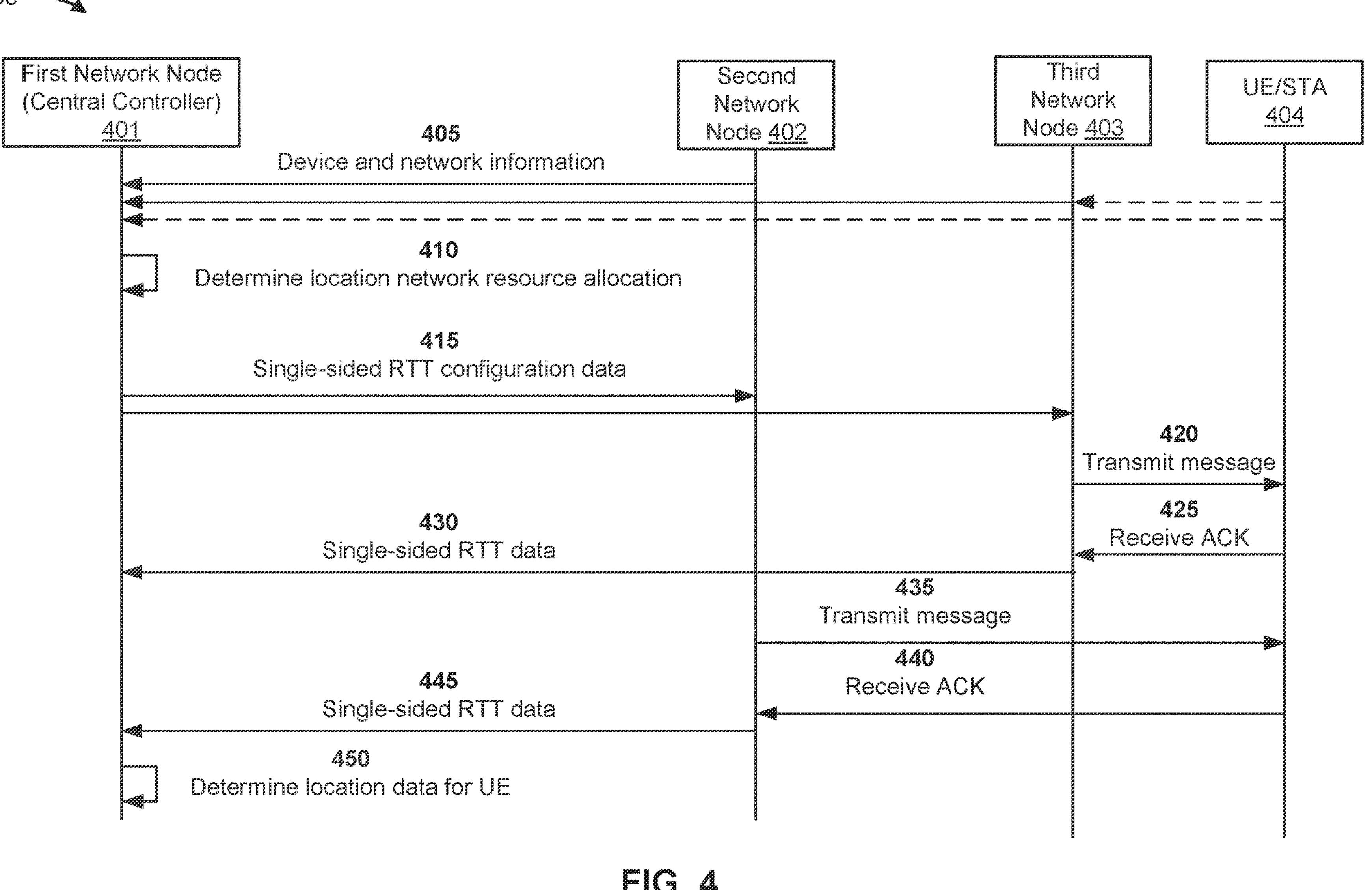
FIGS. 4-6 are diagrams illustrating examples associated with providing location as a service, in accordance with the present disclosure.

FIG. 4 is a diagram illustrating an example 400 associated with providing location as a service, in accordance with the present disclosure. As shown in FIG. 4, example 400 includes communication between a plurality of network nodes (e.g., a first network node 401, a second network node 402, and a third network node 403, as shown) and a UE 404 (e.g., a UE or STA 120). In some aspects, the plurality of network nodes and the UE or STA 120 may be included in a wireless network, such as wireless network 100. In some aspects, one or more network nodes, of the plurality of network nodes, may include a wireless access point, a base station or AP 110, and/or one or more components of a base station 110 (e.g., a DU, a CU, and/or a TRP).

As shown in FIG. 4, the first network node 401 may be configured as a central controller device for a wireless network that includes the second network node 402 and the third network node 403. As shown by reference number 405, the first network node 401 may receive device information and/or network information from the network nodes. The device information received from a network node may indicate one or more capabilities of the network node. For example, the device information received from the second network node may indicate a location ranging technology (e.g., single-sided RTT, Institute of Electrical and Electronics Engineers (IEEE) 802.11mc Fine Timing Measurement based two-sided RTT, IEEE 802.11az non-trigger based single user (SU) ranging, IEEE 802.11az trigger based multiple user (MU) ranging, and/or IEEE 802.11az passive trigger based ranging, among other examples) associated with the second network node.

In some implementations, the network information received from a network node may include information indicating a network condition. For example, the network information received from the second network node 402 may indicate a single quality of a channel, an amount of bandwidth currently being utilized, a data transmission rate, a signal-to-interference-plus-noise ratio (SINR), and/or a quantity of UEs associated with the second network node 402, among other examples.

In some aspects, the first network node 401 may receive device and/or network information from one or more UEs associated with the wireless network (e.g., a UE connected to a network node). For example, the UE 404 may connect to a network node (e.g., the third network node 403). The UE 404 may provide to the first network node 401, either directly or indirectly (e.g., via the third network node 403), an indication of one or more capabilities of the UE 404, one or more services requested by the UE 404 (e.g., a location service), and/or one or more device and/or network characteristics associated with the UE 404. For example, the UE 404 may provide an indication of a maximum bandwidth, a signal quality, and/or a location ranging technology, among other examples associated with the UE 404 to the first network node (e.g., via the third network node 403) based at least in part on connecting to the network node.

In some aspects, the first network node 401 may determine that a location service is to be provided to the UE 404 based at least in part on the device information and/or the network information. For example, the device information received from the UE 404 may include a request for a location service and the first network node 401 may determine that the location service is to be provided to the UE 404 based at least in part on the request. Additionally, or alternatively, the first network node 401 may receive an indication that a location service is to be provided to the UE 404 from another device (e.g., the third network node 403).

As shown by reference number 410, the first network node 401 may determine a location network resource allocation associated with providing the location service to the UE 404. In some aspects, the location network resource allocation may include a location ranging technology for providing the location service to the UE 404. In some aspects, the first network node 401 may determine the location ranging technology to be utilized for providing the location service to the UE 404 in a manner similar to that described elsewhere herein. In some aspects, as indicated in FIG. 4, the first network node 401 may determine to utilize single-sided RTT to provide the location service to the UE 404.

In some aspects, the location network resource allocation may include a group of one or more network nodes to perform the single-sided RTT. In some aspects, the first network node 401 may determine the group of network nodes based at least in part on the device information and/or the network information received from the network nodes included in the network. For example, the first network node 401 may determine the group of network nodes based at least in part on whether a network node is associated with a single-sided RTT capability, whether an amount of traffic associated with a network node satisfies a threshold, a quantity of UEs associated with a network node, whether the UE 404 is associated with the network node, and/or a location of a network node relative to a location of a network node to which the UE 404 is associated (e.g., a location of the third network node 403), among other examples.

In some aspects, the location network resource allocation may include a time at which each network node, included in the group of network nodes, is to perform the single-sided RTT. For example, the location network resource allocation may indicate a time of day, a transmission slot, and/or a time period after an occurrence of an event (e.g., receiving a message from the first network node), among other examples.

In some aspects, the location network resource allocation may include an order in which the group of network nodes are to perform the single-sided RTT. For example, the location network resource allocation may indicate that the third network node 403 is to perform a single-sided RTT procedure first network node 401 and/or that the second network node 402 is to perform a single-sided RTT procedure second.

In some aspects, the first network node 401 may generate single-sided RTT configuration data based at least in part on the location network resource allocation. For example, the first network node 401 may generate single-sided RTT configuration data indicating the group of network nodes, the time at which each network node is to perform a single-sided RTT procedure, and/or an order in which the group of network nodes are to perform the single-sided RTT procedures.

In some aspects, the single-sided RTT configuration data may include movement data associated with the UE 404. For example, the first network node 401 may determine a speed and/or a direction of movement associated with the UE 404 based at least in part on data received from network nodes included in the network.

In some aspects, the single-sided RTT configuration data may indicate a MAC address of a network node that is associated with the UE 404 (e.g., the third network node 403). The MAC address may be included in a message (e.g., a frame, a data packet, and/or another type of communication) transmitted during the single-sided RTT procedure to cause the UE 404 to determine that the message is transmitted to the UE 404 by the network node to which the UE 404 is associated, as described in greater detail elsewhere herein.

In some aspects, the single-sided RTT configuration data may indicate a sequence number to be included in a message transmitted during the single-sided RTT procedure. For example, the first network node 401 may determine a last or most recent sequence number used by the network with the UE 404. The single-sided RTT configuration data may include an indication of the sequence number and/or an indication of a next sequence number that is to be utilized by a network node that is to perform the single-sided RTT procedure next (e.g., first).

In some aspects, the first network node 401 may transmit an indication of the most recent sequence number and/or the next sequence number to a network node based at least in part on the network node being next in the order for performing the single-sided RTT procedure. As an example, the first network node 401 may determine that a first network node 401 (e.g., the third network node 403) has performed the single-sided RTT procedure with the UE 404. The first network node 401 may determine a most recent sequence number (e.g., a sequence number utilized by the third network node 403 to perform the single-sided RTT procedure) and may transmit an indication of the sequence number and/or an indication of a next sequence number to the network node that is next to perform the single-sided RTT procedure (e.g., the second network node). In this way, the first network node 401 may maintain the monotonicity of the sequence number. Maintaining the monotonicity of the sequence number may prevent interoperability issues associated with the UE 404 receiving a message that includes a sequence number other than the next sequence number.

As shown by reference number 415, the first network node 401 may transmit single-sided RTT configuration data to the network nodes included in the group of network nodes (e.g., the second network node, the third network node 403, and one or more additional network nodes (not shown)). In some aspects, the single-sided RTT may be transmitted via a first communication loop of a set of tiered communication loops implemented in the network.

In some aspects, the first communication loop may include communications transmitted between the first network node 401 (e.g., the central controller device) and a resource manager component of a network node. For example, the first network node 401 may transmit the single-sided RTT configuration data to the second network node 402 via a first communication loop that includes the first network node 401 and a resource management component of the second network node 402. Similarly, the first network node 401 may transmit the single-sided RTT configuration data to the third network node 403 via a first communication loop that includes the first network node 401 and a resource management component of the third network node 403.

In some aspects, the resource management component of the third network node 403 may receive the single-sided RTT configuration data from the first network node 401. The resource management component may determine, based at least in part on the single-sided RTT configuration data, that the single-sided RTT procedure is to be performed and/or that the third network node 403 is to perform the single-sided RTT procedure first relative to other network nodes included in the group of network nodes.

In some aspects, the resource management component may determine one or more parameters associated with performing the single-sided RTT procedure. For example, the resource management component may determine a location ranging technology to be utilized (e.g., single-sided RTT), may determine whether a channel change is required, may allocate resources for transmitting one or more messages associated with performing the single-sided RTT procedure, determine a quantity of frames to be transmitted per burst, and/or a time gap between frames, among other examples.

In some aspects, the resource management component may determine whether MAC address spoofing is performed based at least in part on a MAC address indicated in the single-sided RTT configuration data. For example, the resource management component may determine that the single-sided RTT configuration data indicates the MAC address associated with the third network node 403. The resource management component may determine that MAC address spoofing is not to be performed based at least in part on the single-sided RTT configuration data indicating the MAC address associated with the third network node 403.

In some aspects, the resource management component may determine a sequence number to be included in a message transmitted to the UE 404. For example, the single-sided RTT configuration data may indicate a most recent sequence number utilized by the network with the UE 404. The resource management component may increment the most recent sequence number to generate the sequence number to be included in the message transmitted to the UE 404.

The resource management component may transmit an indication of the one or more parameters to a firmware layer of the third network node 403. In some aspects, the one or more parameters are transmitted via a second communication loop that includes the resource management component and the firmware layer of the third network node 403.

In some aspects, one or more parameters associated with performing the single-sided RTT procedure may be transmitted via a third communication loop to cause the single-sided RTT procedure to be performed in accordance with the one or more parameters. In some aspects, the third communication loop may include the firmware layer and a hardware layer of the third network node 403. In some aspects, transmitting the one or more communications via the third communication loop may cause the hardware layer to perform the single-sided RTT procedure.

As shown by reference number 420, the third network node 403 may transmit a message to the UE 404. In some aspects, the message may include a QoS null message. The third network node 403 may record time data associated with transmitting the message to the UE 404. For example, the hardware layer may communicate data associated with transmitting the message to the firmware layer via the third communication loop. The firmware layer may generate and/or record time data indicating a time of day at which the message was transmitted and/or a time stamp associated with transmitting the message.

As shown by reference number 425, the UE 404 may transmit, and the third network device 403 may receive, an ACK based at least in part on receiving the message from the third network node 403. The third network node 403 may record additional time data associated with receiving the ACK from the UE 404. For example, the hardware layer may communicate the ACK to the firmware layer via the third communication loop. The firmware layer may generate and/or record additional time data indicating a time of day at which the ACK was received and/or a time stamp associated with receiving the ACK from the UE 404.

In some aspects, the firmware layer may communicate the time data and/or the additional data to the resource management component via the second communication loop. The resource management component may generate single-sided RTT data based at least in part on the time data and/or the additional time data. In some aspects, the single-sided RTT data may indicate a last sequence number utilized by the third network node 403 with the UE 404.

As shown by reference number 430, the third network node 403 may transmit, and the first network node 401 may receive, the single-sided RTT data based at least in part on performing the single-sided RTT procedure. In some aspects, the single-sided RTT data may be transmitted to the first network node 401 via the first communication loop.

In some aspects, the first network node 401 may determine a next sequence number and may transmit the next sequence number to a network node that is to perform the single-sided RTT procedure next. For example, the single-sided RTT data received from the third network node 403 may include a last sequence number utilized by the third network node 403 with the UE 404. The first network node 401 may determine that the second network node 402 is next to perform the single-sided RTT procedure based at least in part on the order in which the group of network nodes are to perform the single-sided RTT procedures. The first network node 401 may transmit an indication of the last sequence number utilized by the third network node 403 with the UE to the second network node 402.

In some aspects, the second network node 402 may initiate a single-sided RTT procedure with the UE 404 based at least in part on the third network node 403 completing the single-sided RTT procedure with the UE 404, receiving the indication of the last sequence number utilized by the third network node 403 with the UE 404 from the first network node 401 (e.g., via a first communication loop), the order in which the group of network nodes are to perform the single-sided RTT procedure, and/or the time at which the single-sided RTT configuration data indicates that the second network node 402 is to perform the single-sided RTT procedure.

In some aspects, the resource management component of the second network node 402 may determine one or more parameters associated with performing the single-sided RTT procedure based at least in part on the single-sided RTT configuration data. In some aspects, the resource management component may determine the one or more parameters in a manner similar to that described above with respect to the third network node 403.

In some aspects, the resource management component may determine whether MAC address spoofing is performed based at least in part on a MAC address indicated in the single-sided RTT configuration data. For example, the resource management component may determine that the single-sided RTT configuration data indicates a MAC address other than the MAC address associated with the second network node 402. The resource management component may determine that MAC address spoofing is to be performed based at least in part on the single-sided RTT configuration data indicating the MAC address other than the MAC address associated with the second network node 402.

In some aspects, the resource management component may determine a sequence number to be included in a message transmitted to the UE 404. For example, the resource management component may receive an indication of the last sequence number utilized by the second network node 402 from the first network node 401. The resource management component may increment the last sequence number to generate the sequence number to be included in the message transmitted to the UE 404.

The resource management component may transmit an indication of the one or more parameters to a firmware layer of the second network node 402. In some aspects, the one or more parameters are transmitted via a second communication loop that includes the resource management component and the firmware layer of the second network node 402.

In some aspects, one or more parameters associated with performing the single-sided RTT procedure may be transmitted via a third communication loop to cause the single-sided RTT procedure to be performed in accordance with the one or more parameters. In some aspects, the third communication loop may include the firmware layer and a hardware layer of the second network node 402. In some aspects, transmitting the one or more communications via the third communication loop may cause the hardware layer to perform the single-sided RTT procedure.

As shown by reference number 435, the second network node 402 may transmit a message to the UE 404. In some aspects, the message may include a QoS null message. In some aspects, the second network node 402 may perform MAC address spoofing, and the message may indicate that the message is transmitted to the UE 404 by the third network node 403 (e.g., the network node with which the UE 404 is associated). In some aspects, the message may include the sequence number generated by the resource management component.

In some aspects, the second network node 402 may record time data associated with transmitting the message to the UE 404. For example, the hardware layer may communicate data associated with transmitting the message to the firmware layer via the third communication loop. The firmware layer may generate and/or record time data indicating a time of day at which the message was transmitted and/or a time stamp associated with transmitting the message.

As shown by reference number 440, the UE 404 may transmit an ACK based at least in part on receiving the message from the second network node 402. In some aspects, the UE 404 may transmit the ACK to the third network node 403 based at least in part on the message indicating that the message was transmitted to the UE 404 by the third network node 403. In some aspects, the second network node 402 may monitor messages transmitted to the third network node 403 based at least in part on performing address spoofing using the MAC address of the third network node 403. The second network node 402 may receive the ACK based at least in part on monitoring the messages transmitted to the third network node 403.

The second network node 402 may record additional time data associated with receiving the ACK. For example, the hardware layer may communicate the ACK to the firmware layer via the third communication loop. The firmware layer may generate and/or record additional time data indicating a time of day at which the ACK was received and/or a time stamp associated with receiving the ACK.

In some aspects, the firmware layer may communicate the time data and/or the additional data to the resource management component via the second communication loop. The resource management component may generate single-sided RTT data based at least in part on the time data and/or the additional time data. In some aspects, the single-sided RTT data may indicate a last sequence number utilized by the second network node with the UE.

As shown by reference number 445, the second network node 402 may transmit, and the first network node 401 may receive, the single-sided RTT data based at least in part on performing the single-sided RTT procedure. In some aspects, the single-sided RTT data may be transmitted to the first network node via the first communication loop.

In some aspects, the first network node 401 may determine a next sequence number and may transmit the next sequence number to a network node that is to perform the single-sided RTT procedure next. For example, the single-sided RTT data received from the second network node 402 may include a last sequence number utilized by the second network node 402 with the UE 404. The first network node 401 may determine that a fourth network node (not shown) is next to perform the single-sided RTT procedure based at least in part on the order in which the group of network nodes are to perform the single-sided RTT procedures. The first network node 401 may transmit an indication of the last sequence number utilized by the second network node 402 with the UE 404 to the fourth network node.

In some aspects, each network node included in the group of network nodes may perform a single-sided RTT procedure with the UE 404 and may transmit single-sided RTT data to the first network node 401 in a manner similar to that described above. The first network node 401 may determine that single-sided RTT data is received from each network node included in the group of network nodes and, as shown by reference number 450, the first network node 401 may determine location data for the UE 404 based at least in part on the single-sided RTT data received from the group of network nodes.

As an example, the first network node 401 may determine a first time that corresponds to time at which the third network node 403 transmitted the message to the UE 404 and a second time that corresponds to a time at which the third network node 403 received the ACK from the UE 404 based at least in part on the single-sided RTT data received from the third network node 403. The first network node 401 may determine a value corresponding to a difference between the first time and the second time. The first network node 401 may determine that the value corresponds to a round trip time (e.g., an amount of time for the message to propagate from the third network node 403 to the UE 404 plus an amount of time for the ACK to propagate from the UE 404 to the third network node 403) plus a turnaround time (e.g., an amount of time from the UE 404 receiving the message until the UE 404 transmits the ACK).

The first network node 401 may determine a corresponding value for each network node included in the group of network nodes. The first network node 401 may utilize the determined values to determine an estimated turnaround time associated with the UE 404. The first network node 401 may determine location data for the UE 404 based at least in part on the estimated turnaround time.

In some aspects, the first network node 401 may provide the location data to the UE 404. For example, the first network node 401 may transmit the location data to the third network node 403 and the third network node 403 may forward the location data to the UE 404.

Network nodes (e.g., APs) are controlled by a central controller and can be arranged to range with a STA one-by-one close in time. The STA may have an unknown turnaround time, which can be estimated along with the unknown coordinates of the STA by resolving the equations formed by multiple APs. Single-sided RTT achieves accurate ranging performance in enterprise location use cases, and the performance can be much better than RSSI-based ranging. However, a network node (e.g., AP) cannot perform a single-sided RTT with an unassociated client (limited performance). By using a location controller (slow-loop) to inform all location-desiring APs (mid-loop) to send messages (e.g., QoS null frames) to the STA by spoofing the MAC address of the frame to be that of the associated AP, the STA does not reject the messages, as the messages from other APs appear to come from the associated AP. When spoofing the MAC address, the AP network may need to maintain the monotonicity of the sequence number (SN) in order to prevent interoperability issues. This can be achieved by the AP network via an AP controller to indicate the last SN used by the AP network with the peer device such that the next spoofing AP can increase the SN in the spoofed QoS null frame to maintain the monotonicity of the SN. While QoS null frames are discussed in examples, with a sequence number properly maintained within the AP network, the aspects described herein can be generalized to other frames and not just QoS null frames. In some aspects, the second network node 402 and/or the third network node 403 may estimate an angle of arrival (AoA) data of an ACK and transmit angle of arrival data to the first network node 401. The angle of arrival for an ACK received a network node may indicate the relative angle of the UE 404 to the network node. The first network node 401 may determine the location of the UE 404 further based at least in part on determining the location of the UE 404. If both single-sided RTT data and angle of arrival data are available, first network node 401 may combine the single-sided RTT data and the angle of arrival data to further improve location performance or to reduce the quantity of required APs to derive the location of the UE 404. Alternatively, in some aspects, the first network node 401 may use the angle of arrival data alone to locate the UE 404.

Single-sided RTT data may involve an AP sending a QoS null frame, capturing a time of departure, receiving an ACK, capturing a time of arrival, and then estimating single-sided RTT. By contrast, the angle of arrival data does not require the AP to send any signal or message. The AP may just receive an ACK, which would be sufficient to estimate an angle of arrival of the ACK. That is, a network controller may request a quantity of APs to come to the same channel at roughly the same time, and let only one of the APs send a QoS null frame (with spoofed MAC address if this is not the associated AP). Then, all of the APs may listen to the ACK from the UE 404 and use the same ACK to estimate the angle of arrival to locate the UE 404. In this way, the first network node 401 may not be concerned with sending multiple QoS nulls frames and taking too long with the risk that the UE 404 has changed locations.

As indicated above, FIG. 4 is provided as an example. Other examples may differ from what is described with respect to FIG. 4.

Figure 5:
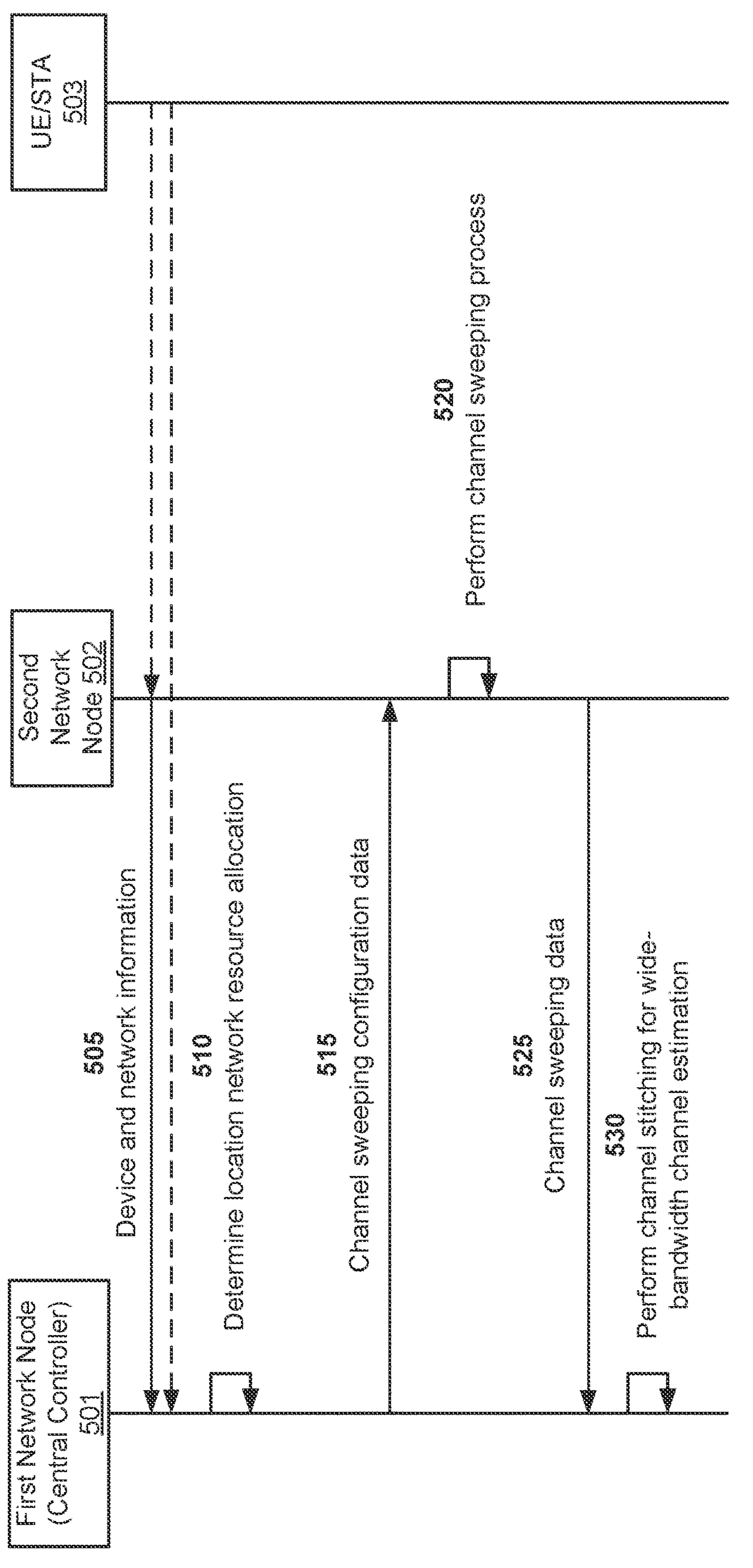

FIG. 5 is a diagram illustrating an example 500 associated with providing location as a service, in accordance with the present disclosure. As shown in FIG. 5, example 500 includes communication between a first network node 501, a second network node 502, and a UE 503 (e.g., a UE or STA 120). In some aspects, the first network node 501, the second network node 502, and the UE 503 may be included in a wireless network, such as wireless network 100. In some aspects, the first network node 501 and/or the second network node 502 may include a wireless access point, a base station 110, and/or one or more components of a base station 110 (e.g., a DU, a CU, and/or a TRP).

As shown in FIG. 5, the first network node 501 may be configured as a central controller device for a wireless network that includes a plurality of network nodes, including the second network node 502. As shown by reference number 505, the first network node 501 may receive device information and/or network information from the plurality of network nodes (e.g., from the second network node 502, as shown). In some aspects, the first network node 501 may receive the device information and/or the network information in a manner similar to that described above with respect to FIG. 4.

In some aspects, the first network node 501 may receive device and/or network information from one or more UEs associated with the wireless network (e.g., a UE connected to a network node). For example, a UE may connect to a network node (e.g., the second network node 502). The UE 503 may provide to the first network node 501, either directly or indirectly (e.g., via the second network node 502), an indication of one or more capabilities of the UE 503, one or more services requested by the UE 503 (e.g., a location service), and/or one or more device and/or network characteristics associated with the UE 503 in a manner similar to that described above with respect to FIG. 4.

In some aspects, the first network node 501 may determine that a location service is to be provided to the UE 503 based at least in part on the device information and/or the network information. For example, the device information received from the UE 503 may include a request for a location service, and the first network node 501 may determine that the location service is to be provided to the UE 503 based at least in part on the request. Additionally, or alternatively, the first network node 501 may receive an indication that a location service is to be provided to the UE 503 from another device (e.g., the second network node 502).

As shown by reference number 510, the first network node 501 may determine a location network resource allocation associated with providing the location service to the UE 503. In some aspects, the first network node 501 may determine the location ranging technology to be utilized for providing the location service to the UE 503 in a manner similar to that described elsewhere herein. In some aspects, as indicated in FIG. 5, the first network node 501 may determine to perform a channel sweeping process to provide the location service to the UE 503.

In some aspects, the location network resource allocation may include a frequency band (e.g., a 5 GHz frequency band or a 6 GHz frequency band) and/or a region within a frequency band (e.g., a 5 GHz lower frequency band, a dynamic frequency selection (DFS) band, and/or a 5 GHz higher frequency band of a 5 GHz frequency band) for performing channel sweeping. In some aspects, the first network node 501 may receive a channel status report from each of the plurality of network nodes. The channel status report may indicate whether a channel associated with a network node is idle and/or busy, among other characteristics of the channel. The first network node 501 may determine a frequency band and/or a region within the frequency band for performing channel sweeping based at least in part on the channel status reports received from the plurality of network nodes.

In some aspects, the channel sweeping procedure is to be completed within a relatively short amount of time (e.g., within 100 ms) to ensure that the location of the UE does not change by more than a distance corresponding to half a wavelength (e.g., about 3 cm) and/or to enable the channel responses obtained by performing the channel sweeping process can be considered coherent and stitched together. Because the first network node 501 receives the channel status reports from the plurality of network nodes, the first network node 501 is able to select a frequency band and/or a region within the frequency band that is not busy (e.g., less than a threshold amount of traffic) and minimizes co-channel interference and/or adjacent channel interference.

In some aspects, the first network node 501 may generate channel sweeping configuration data based at least in part on the location network resource allocation. For example, the first network node 501 may generate channel sweeping configuration data that indicates the selected frequency band and/or the selected region within the frequency band.

As shown by reference number 515, the first network node 501 may transmit the channel sweeping configuration data to the second network node 502. In some aspects, the first network node 501 may transmit the channel sweeping configuration data to the second network node 502 via a first communication loop that includes the first network node 501 (e.g., the central controller device) and a resource management component of the second network node 502.

In some aspects, the resource management component of the second network node 502 may receive the channel sweeping configuration data from the first network node 501. The resource management component may determine, based at least in part on the channel sweeping configuration data, that a channel sweeping procedure is to be performed.

In some aspects, the resource management component may determine one or more parameters associated with performing the channel sweeping procedure. For example, the resource management component may determine single or mixed sweeping bandwidth, a quantity of channels to sweep, a time gap between frames, resources to be utilized to perform the channel sweeping procedure, and/or a priority associated with data transmitted as part of the channel sweeping procedure, among other examples.

The resource management component may transmit an indication of the one or more parameters to a firmware layer of the second network node 502. In some aspects, the one or more parameters are transmitted via a second communication loop that includes the resource management component and the firmware layer of the second network node 502.

In some aspects, one or more parameters associated with performing the channel sweeping procedure may be transmitted via a third communication loop to cause the channel sweeping procedure to be performed in accordance with the one or more parameters. In some aspects, the third communication loop may include the firmware layer and a hardware layer of the second network node 502.

In some aspects, as shown by reference number 520, the hardware layer may perform the channel sweeping procedure based at least in part on the one or more parameters. For example, the hardware layer may change to a channel indicated by the one or more parameters, transmit and receive frames, capture channel estimation data, and/or capture time stamps associated with the transmitted and received frames.

In some aspects, the hardware layer may provide the channel estimation data and the time stamps to the firmware layer via the third communication loop. In some aspects, the firmware layer may generate channel sweeping data based at least in part on the channel estimation data and the time stamps.

In some aspects, the firmware layer may transmit the channel sweeping data to the resource management component via the second communication loop. Additionally, or alternatively, the firmware may transmit the channel estimation data and the time stamps to the resource management component and the resource management component may generate the channel sweeping data.

As shown by reference number 525, the second network node (e.g., the resource management component) may transmit the channel sweeping data to the first network node 501. In some aspects, the second network node 502 may transmit the channel sweeping data to the first network node 501 via the first communication loop. The first network node 501 may receive the channel sweeping data and, as shown by reference number 530, the first network node 501 may perform channel stitching for wide-bandwidth channel estimation based at least in part on the channel sweeping data.

In some aspects, the first network node 501 may determine location information for the UE 503 based at least in part on performing the channel stitching. In some aspects, the first network node 501 may provide the location information to the UE (e.g., via the second network node 502).

In some aspects, a slow loop may involve band and region selection (from a channel status reported by multiple APs). A mid loop may generate a band and channel status report (e.g., single AP has 3-band Wi-Fi chips and can report idle/busy status for each band) and involve channel stitching and/or channel sweeping parameters selection (e.g., single or mixed sweeping bandwidth, number of channels to sweep, time gap between frames, scheduling and priority). A fast loop may change channels, transmit and receive frames, and/or capture channel estimation and timestamps.

As indicated above, FIG. 5 is provided as an example. Other examples may differ from what is described with respect to FIG. 5.

Figure 6:
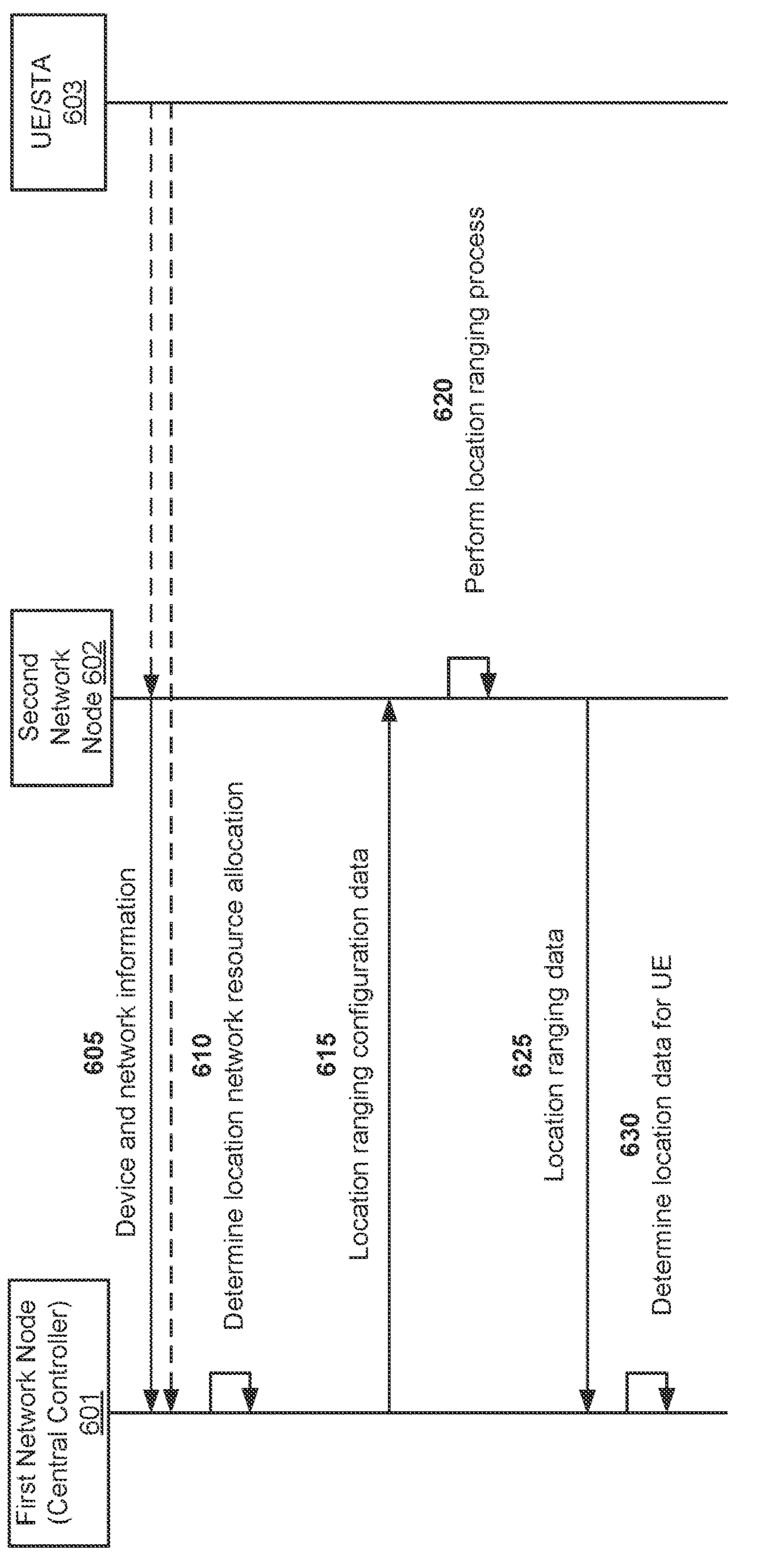

FIG. 6 is a diagram illustrating an example 600 associated with providing location as a service, in accordance with the present disclosure. As shown in FIG. 6, example 600 includes communication between a first network node 601, a second network node 602, and a UE 603 (e.g., a UE or STA 120). In some aspects, the first network node 601, the second network node 602, and the UE 603 may be included in a wireless network, such as wireless network 100. In some aspects, the first network node 601 and/or the second network node 602 may include a wireless access point, a base station 110, and/or one or more components of a base station 110 (e.g., a DU, a CU, and/or a TRP).

As shown in FIG. 6, the first network node 601 may be configured as a central controller device for a wireless network that includes a plurality of network nodes, including the second network node 602. As shown by reference number 605, the first network node 601 may receive device information and/or network information from the plurality of network nodes (e.g., from the second network node 602, as shown). In some aspects, the first network node 601 may receive the device information and/or the network information in a manner similar to that described above with respect to FIG. 4.

In some aspects, the first network node 601 may receive device and/or network information from one or more UEs associated with the wireless network (e.g., a UE connected to a network node). For example, the UE 603 may connect to a network node (e.g., the second network node 602). The UE 603 may provide to the first network node 601, either directly or indirectly (e.g., via the second network node 602), an indication of one or more capabilities of the UE 603, one or more services requested by the UE 603 (e.g., a location service), and/or one or more device and/or network characteristics associated with the UE 603 in a manner similar to that described above with respect to FIG. 4.

In some aspects, the first network node 601 may determine that a location service is to be provided to the UE 603 based at least in part on the device information and/or the network information. For example, the device information received from the UE 603 may include a request for a location service and the first network node 601 may determine that the location service is to be provided to the UE 603 based at least in part on the request. Additionally, or alternatively, the first network node 601 may receive an indication that a location service is to be provided to the UE 603 from another device (e.g., the second network node 602).

As shown by reference number 610, the first network node 601 may determine a location network resource allocation associated with providing the location service to the UE 603. In some aspects, the location network resource allocation may include a location ranging technology to be utilized for providing the location service to the UE 603.

In some aspects, the first network node 601 may receive device information, network information, and/or a channel status report from each of the plurality of network nodes. The first network node 601 may determine the location ranging technology based at least in part on the device information, the network information, and/or the channel status report received from each of the plurality of network nodes. For example, the first network node 601 may determine the location ranging technology based at least in part on a capability of the network nodes indicated in the device information, a network condition indicated by the network information, a particular use case associated with a network condition indicated by the network information, a performance requirement associated with providing the location service, a ranging capability of a network node (e.g., a maximum bandwidth, a quantity of chains and streams, and/or protocols supported by the network node, among other examples), a security requirement (e.g., whether secure ranging or non-secure ranging is performed), a network usage condition (e.g., whether a network node is overloaded or underloaded), and/or an accuracy associated with each location ranging technology based at least in part on the current network conditions.

In some aspects, the location network resource allocation may include a group of network nodes, of the plurality of network nodes, that are to perform a location ranging procedure (e.g., a single-sided RTT procedure and/or a channel sweeping procedure, among other examples) associated with the selected location ranging technology. In some aspects, the first network node 601 may select the group of network nodes, from the plurality of network nodes, based at least in part on the device information and/or the network information received from the plurality of network nodes. In some aspects, the first network node 601 may select the group of network nodes in a manner similar to that described above.

In some aspects, the selected location ranging technology may include single-sided RTT and the location ranging configuration data include single-sided RTT configuration data. In some aspects, the single-sided RTT configuration data may be similar to the single-sided RTT configuration data described above. For example, the single-sided RTT configuration data may indicate the group of network nodes, a UE with which the single-sided RTT procedure is to be performed, a time at which each network node is to perform a single-sided RTT procedure, and/or an order in which the group of network nodes are to perform the single-sided RTT procedures.

In some aspects, the selected ranging technology may include channel sweeping and the location ranging configuration data may include channel sweeping configuration data. In some aspects, the channel sweeping configuration data may be similar to the channel sweeping data described above. For example, the channel sweeping data may indicate a frequency band and/or a region within a frequency band for performing a channel sweeping procedure.

In some aspects, the selected ranging technology may include IEEE 802.11mc Fine Timing Measurement based two-sided RTT and the location ranging configuration data may include IEEE 802.11mc Fine Timing Measurement based two-sided RTT configuration data. In some aspects, the IEEE 802.11mc Fine Timing Measurement based two-sided RTT configuration data may indicate the group of network nodes, a UE with which the IEEE 802.11mc Fine Timing Measurement based two-sided RTT procedure is to be performed, a time at which each network node is to perform the IEEE 802.11mc Fine Timing Measurement based two-sided RTT procedure, and/or an order in which the group of network nodes are to perform the IEEE 802.11mc Fine Timing Measurement based two-sided RTT procedure.

In some aspects, the selected ranging technology may include 11az two-sided RTT (e.g., IEEE 802.11az non-trigger based SU ranging, IEEE 802.11az trigger based MU ranging, and/or IEEE 802.11az passive trigger based ranging) and the location ranging configuration data may include 11az two-sided RTT configuration data. In some aspects, the 11az two-sided RTT configuration data may indicate the group of network nodes, a UE with which the 11az two-sided RTT procedure is to be performed, a time at which each network node is to perform the 11az two-sided RTT procedure, and/or an order in which the group of network nodes are to perform the 11az two-sided RTT procedure.

In some aspects, the first network node 601 may generate location ranging configuration data based at least in part on the location network resource allocation. For example, the first network node 601 may generate location ranging configuration data that indicates the selected location ranging technology.

As shown by reference number 615, the first network node 601 may transmit the location ranging configuration data to the second network node 602. In some aspects, the first network node 601 may transmit the location ranging configuration data to the second network node 602 via a first communication loop that includes the first network node 601 (e.g., the central controller device) and a resource management component of the second network node 602.

In some aspects, the resource management component of the second network node 602 may receive the location ranging configuration data from the first network node 601. The resource management component may determine, based at least in part on the location ranging configuration data, that a location ranging procedure associated with the selected location ranging technology is to be performed.

In some aspects, the resource management component may determine one or more parameters associated with performing the location ranging procedure. For example, the location ranging procedure may include a single-sided RTT procedure and the resource management component may determine whether a channel change is required, may allocate resources for transmitting one or more messages associated with performing the single-sided RTT procedure, determine a quantity of frames to be transmitted per burst, and/or a time gap between frames, among other examples.

As another example, the location ranging procedure may include a channel sweeping procedure and the resource management component may determine whether a channel change is required, single or mixed sweeping bandwidth, a quantity of channels to sweep, a time gap between frames, resources to be utilized to perform the channel sweeping procedure, and/or a priority associated with data transmitted as part of the channel sweeping procedure, among other examples.

As another example, the location ranging procedure may include an IEEE 802.11mc Fine Timing Measurement based two-sided RTT procedure and the resource management component may determine a preamble and bandwidth, a quantity of frames per burst, a time gap between frames, and/or a burst duration, among other examples.

As another example, the location ranging procedure may include a 11az two-sided RTT procedure and the resource management component may determine whether the 11az two-sided RTT procedure is to be performed with MAC security, physical layer security, passive ranging, active ranging, non-trigger based, trigger based, UEs to be grouped in a sounding sequence, a minimum time between measurements, and/or a maximum time between measurements, among other examples.

The resource management component may transmit an indication of the one or more parameters to a firmware layer of the second network node 602. In some aspects, the one or more parameters are transmitted via a second communication loop that includes the resource management component and the firmware layer of the second network node 602.

In some aspects, one or more parameters associated with performing the location ranging procedure may be transmitted via a third communication loop to cause the location ranging procedure to be performed in accordance with the one or more parameters. In some aspects, the third communication loop may include the firmware layer and a hardware layer of the second network node 602.

In some aspects, as shown by reference number 620, the hardware layer may perform the location ranging procedure based at least in part on the one or more parameters. For example, the hardware layer may change to a channel indicated by the one or more parameters, transmit and receive frames, capture data, and/or capture time stamps associated with the transmitted and received frames.

In some aspects, the hardware layer may provide the captured data and the time stamps to the firmware layer via the third communication loop. In some aspects, the firmware layer may generate location ranging data based at least in part on performing the location ranging procedure.

In some aspects, the firmware layer may transmit the location ranging data to the resource management component via the second communication loop. Additionally, or alternatively, the firmware may transmit the captured data and the time stamps to the resource management component, and the resource management component may generate the location ranging data.

As shown by reference number 625, the second network node 602 (e.g., the resource management component) may transmit the location ranging data to the first network node 601. In some aspects, the second network node 602 may transmit the location ranging data to the first network node 601 via the first communication loop. The first network node 601 may receive the location ranging data and, as shown by reference number 630, the first network node 601 may determine location data for the UE 603 based at least in part on the location ranging data. In some aspects, the first network node 601 may provide the location information to the UE 603 (e.g., via the second network node).

In some aspects, a slow loop involves location network resource allocation based on APs and peer devices capabilities, location protocol selection based on use cases and performance requirements, and/or network location performance optimization. A mid loop involves frame scheduling, protocol parameters selection and configuration, and/or location measurements aggregation. A fast loop involves frame exchange and location measurements reporting.

There are many ranging technologies to select from (e.g., single-sided RTT, IEEE 802.11mc two-sided RTT, IEEE 802.11az SU ranging, IEEE 802.11az MU ranging, IEEE 802.11az passive ranging). Single-sided RTT may indicate which APs to range with which STAs at what time and order, a quantity of frames per burst, and/or a time gap between frames. IEEE 802.11mc two-sided RTT may indicate which APs to range with which STAs at what time and order, a preamble and bandwidth, a quantity of frames per burst, a time gap between frames, and/or a burst duration. IEEE 802.11az two-sided RTT may indicate which APs to range with which STAs at what time and order, with or without MAC security, with or without PHY security, passive or active ranging, non-trigger based or trigger based, which STAs to group in a sounding sequence, a minimum time between measurements, and/or a maximum time between measurements.

In some aspects, selecting the right ranging technology not only improves ranging performance but also optimizes the usage of network resource. The selection may be based at least in part on the specific key performance indicator and security requirements of the ranging use case (e.g., centimeter level, decimeter level, or meter level, secure ranging or non-secure), the ranging capabilities of the APs and STAs (e.g., maximum bandwidth, number of chains and streams, supported protocols), and/or the network resource usage condition (e.g., balancing overloaded and underloaded APs).

As indicated above, FIG. 6 is provided as an example. Other examples may differ from what is described with respect to FIG. 6.

Figure 7:
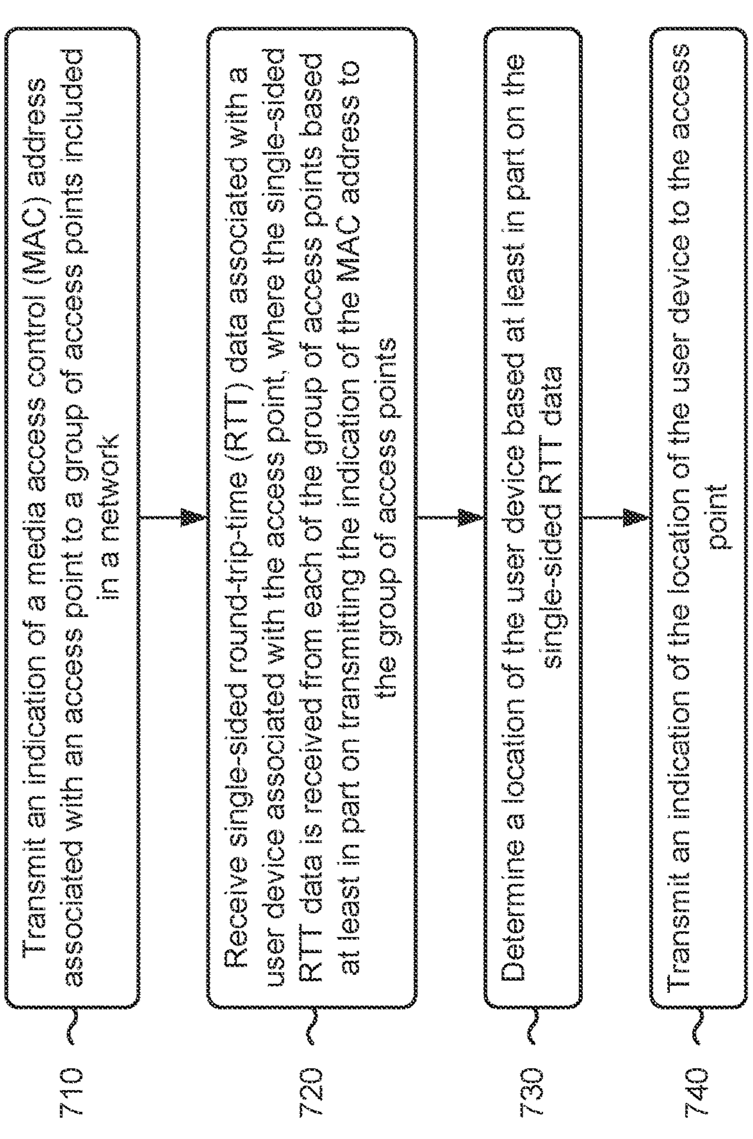
FIGS. 7-11 are diagrams illustrating example processes associated with providing location as a service, in accordance with the present disclosure.

FIG. 7 is a diagram illustrating an example process 700 performed, for example, by a network node, in accordance with the present disclosure. Example process 700 is an example where the network node (e.g., the first network node 401, the base station or AP 110, and/or a component of the base station or AP 110) performs operations associated with location as a service.

As shown in FIG. 7, in some aspects, process 700 may include transmitting an indication of a MAC address associated with an access point to a group of access points included in a network (block 710). For example, the network node (e.g., using communication manager 1208 and/or transmission component 1204, depicted in FIG. 12) may transmit an indication of a MAC address associated with an access point to a group of access points included in a network, as described above.

As further shown in FIG. 7, in some aspects, process 700 may include receiving single-sided RTT data associated with a user device associated with the access point, where the single-sided RTT data is received from each of the group of access points based at least in part on transmitting the indication of the MAC address to the group of access points (block 720). For example, the network node (e.g., using communication manager 1208 and/or reception component 1202, depicted in FIG. 12) may receive single-sided RTT data associated with a user device associated with the access point, where the single-sided RTT data is received from each of the group of access points based at least in part on transmitting the indication of the MAC address to the group of access points, as described above.

As further shown in FIG. 7, in some aspects, process 700 may include determining a location of the user device based at least in part on the single-sided RTT data (block 730). For example, the network node (e.g., using communication manager 1208 and/or determination component 1210, depicted in FIG. 12) may determine a location of the user device based at least in part on the single-sided RTT data, as described above.

As further shown in FIG. 7, in some aspects, process 700 may include transmitting an indication of the location of the user device to the access point (block 740). For example, the network node (e.g., using communication manager 1208 and/or transmission component 1204, depicted in FIG. 12) may transmit an indication of the location of the user device to the access point, as described above.

Process 700 may include additional aspects, such as any single aspect or any combination of aspects described below and/or in connection with one or more other processes described elsewhere herein.

In a first aspect, process 700 includes selecting the group of access points from a plurality of access points included in the network based at least in part on one or more criteria.

In a second aspect, alone or in combination with the first aspect, process 700 includes transmitting, to the group of access points, an indication of an order in which the group of access points are to perform a single-sided RTT process associated with obtaining the single-sided RTT data.

In a third aspect, alone or in combination with one or more of the first and second aspects, process 700 includes transmitting, to the group of access points, an indication of times at which each access point, of the group of access points, is to perform a single-sided RTT process associated with obtaining the single-sided RTT data.

In a fourth aspect, alone or in combination with one or more of the first through third aspects, process 700 includes determining, based at least in part on the single-sided RTT data, an estimated turnaround time associated with the user device.

In a fifth aspect, alone or in combination with one or more of the first through fourth aspects, process 700 includes maintaining a monotonicity of a sequence number associated with communications between the network and the user device.

In a sixth aspect, alone or in combination with one or more of the first through fifth aspects, process 700 includes transmitting an indication of a most recent sequence number to a particular access point, of the group of access points, that is next to perform a single-sided RTT process to obtain the single-sided RTT data to maintain the monotonicity of the sequence number associated with the communications between the network and the user device.

In a seventh aspect, alone or in combination with one or more of the first through sixth aspects, process 700 includes receiving angle of arrival data associated with the user device associated with the access point, where the angle of arrival data is received from each of the group of access points, and determining the location of the user device further based at least in part on the angle of arrival data.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
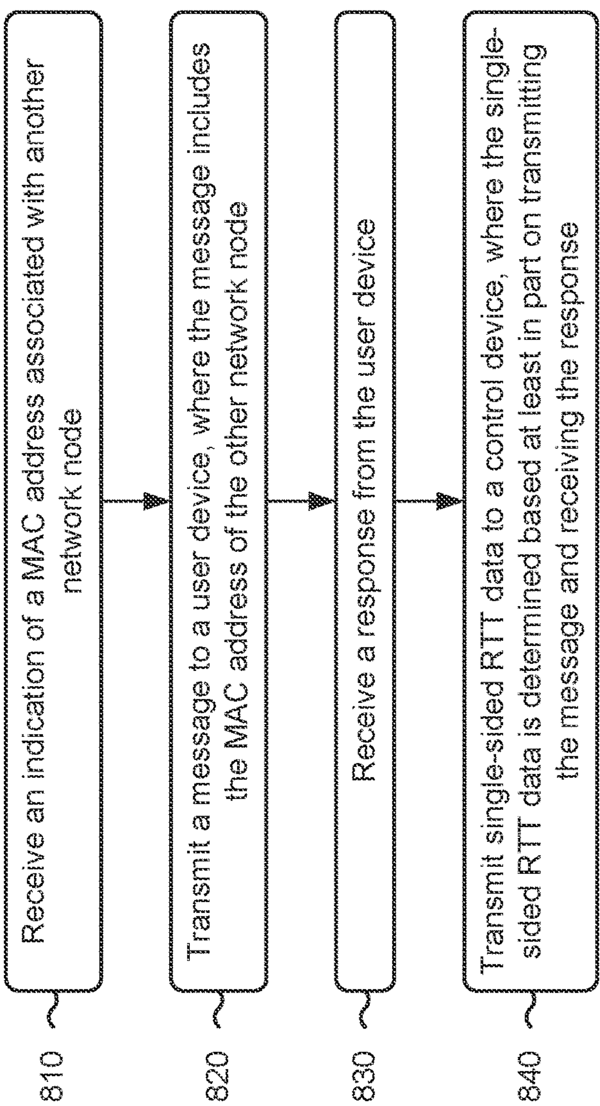

FIG. 8 is a diagram illustrating an example process 800 performed, for example, by a network node, in accordance with the present disclosure. Example process 800 is an example where the network node (e.g., the second network node 402, the base station or AP 110, and/or a component of the base station or AP 110) performs operations associated with location as a service.

As shown in FIG. 8, in some aspects, process 800 may include receiving an indication of a MAC address associated with another network node (block 810). For example, the network node (e.g., using communication manager 1308 and/or reception component 1302, depicted in FIG. 13) may receive an indication of a MAC address associated with another network node, as described above.

As further shown in FIG. 8, in some aspects, process 800 may include transmitting a message to a user device, where the message includes the MAC address of the other network node (block 820). For example, the network node (e.g., using communication manager 1308 and/or transmission component 1304, depicted in FIG. 13) may transmit a message to a user device, where the message includes the MAC address of the other network node, as described above.

As further shown in FIG. 8, in some aspects, process 800 may include receiving a response from the user device (block 830). For example, the network node (e.g., using communication manager 1308 and/or reception component 1302, depicted in FIG. 13) may receive a response from the user device, as described above.

As further shown in FIG. 8, in some aspects, process 800 may include transmitting single-sided RTT data to a control device, where the single-sided RTT data is determined based at least in part on transmitting the message and receiving the response (block 840). For example, the network node (e.g., using communication manager 1308 and/or transmission component 1304, depicted in FIG. 13) may transmit single-sided RTT data to a control device, where the single-sided RTT data is determined based at least in part on transmitting the message and receiving the response, as described above.

Process 800 may include additional aspects, such as any single aspect or any combination of aspects described below and/or in connection with one or more other processes described elsewhere herein.

In a first aspect, process 800 includes receiving an indication of an order in which a group of network nodes are to perform a single-sided RTT process associated with obtaining the single-sided RTT data, where the network node is included in the group of network nodes, and where the message is transmitted to the user device according to the order.

In a second aspect, alone or in combination with the first aspect, process 800 includes receiving an indication of times at which each network node, of a group of network nodes, is to perform a single-sided RTT process associated with obtaining the single-sided RTT data, where the network node is included in the group of network nodes, and where the message is transmitted to the user device according to the indication of the times at which each network node, of the group of network nodes is to perform the single-sided RTT process.

In a third aspect, alone or in combination with one or more of the first and second aspects, process 800 includes receiving an indication of a sequence number associated with communications between the other network node and the user device, and incrementing the sequence number, where the message includes the incremented sequence number.

In a fourth aspect, alone or in combination with one or more of the first through third aspects, process 800 includes transmitting angle of arrival data to the control device, wherein the angle of arrival data is determined based at least in part on receiving the response.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
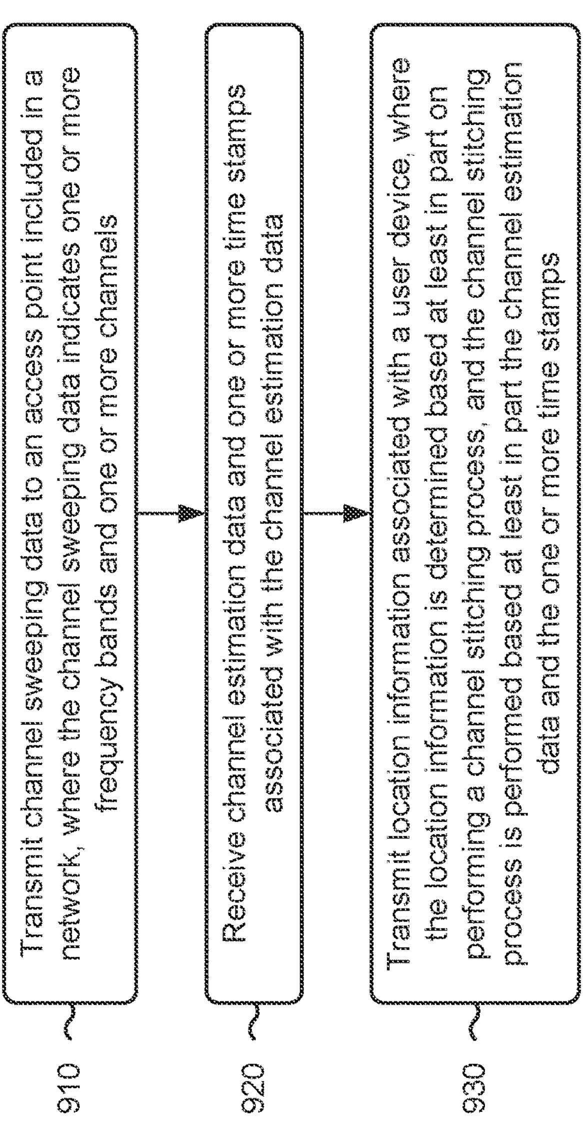

FIG. 9 is a diagram illustrating an example process 900 performed, for example, by a network node, in accordance with the present disclosure. Example process 900 is an example where the network node (e.g., the first network node 501, the base station or AP 110, and/or a component of the base station or AP 110) performs operations associated with location as a service.

As shown in FIG. 9, in some aspects, process 900 may include transmitting channel sweeping data to an access point included in a network, where the channel sweeping data indicates one or more frequency bands and one or more channels (block 910). For example, the network node (e.g., using communication manager 1408 and/or transmission component 1404, depicted in FIG. 14) may transmit channel sweeping data to an access point included in a network, where the channel sweeping data indicates one or more frequency bands and one or more channels, as described above.

As further shown in FIG. 9, in some aspects, process 900 may include receiving channel estimation data and one or more time stamps associated with the channel estimation data (block 920). For example, the network node (e.g., using communication manager 1408 and/or reception component 1402, depicted in FIG. 14) may receive channel estimation data and one or more time stamps associated with the channel estimation data, as described above.

As further shown in FIG. 9, in some aspects, process 900 may include transmitting location information associated with a user device, where the location information is determined based at least in part on performing a channel stitching process, and where the channel stitching process is performed based at least in part the channel estimation data and the one or more time stamps (block 930). For example, the network node (e.g., using communication manager 1408 and/or transmission component 1404, depicted in FIG. 14) may transmit location information associated with a user device, where the location information is determined based at least in part on performing a channel stitching process, and where the channel stitching process is performed based at least in part the channel estimation data and the one or more time stamps, as described above.

Process 900 may include additional aspects, such as any single aspect or any combination of aspects described below and/or in connection with one or more other processes described elsewhere herein.

In a first aspect, process 900 includes receiving an indication of traffic loads associated with the network and determining the channel sweeping data based at least in part on the traffic loads.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
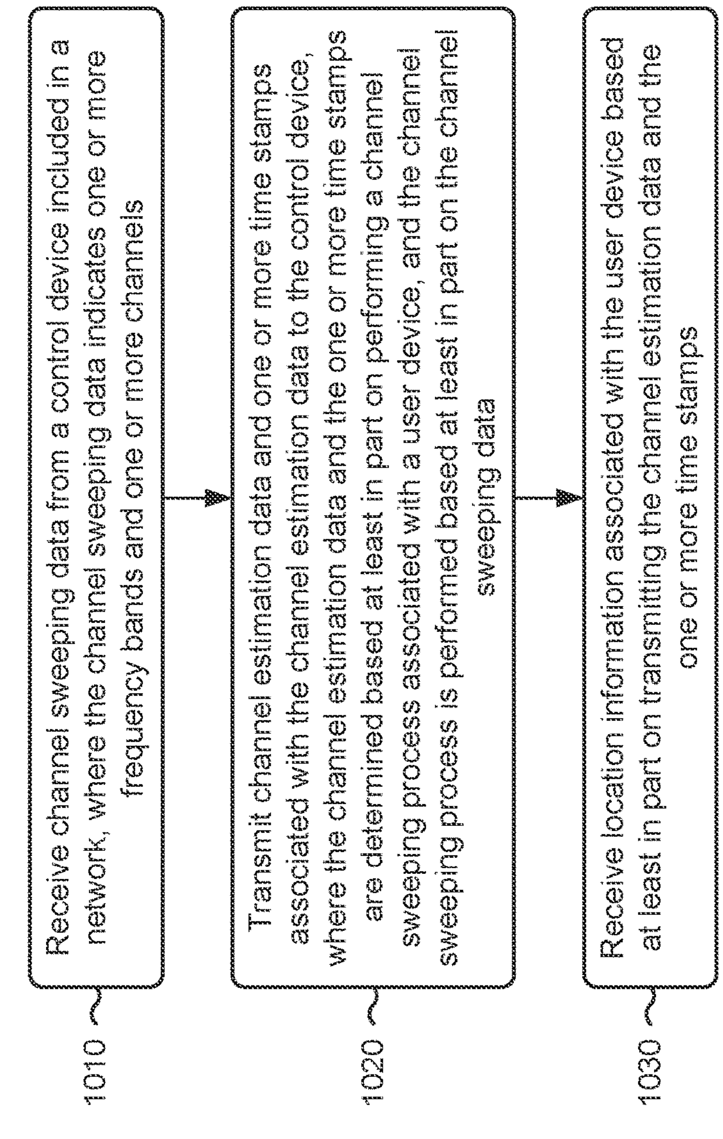

FIG. 10 is a diagram illustrating an example process 1000 performed, for example, by a network node, in accordance with the present disclosure. Example process 1000 is an example where the network node (e.g., the second network node 502, the base station or AP 110, and/or a component of the base station or AP 110) performs operations associated with location as a service.

As shown in FIG. 10, in some aspects, process 1000 may include receiving channel sweeping data from a control device included in a network, where the channel sweeping data indicates one or more frequency bands and one or more channels (block 1010). For example, the network node (e.g., using communication manager 1508 and/or reception component 1502, depicted in FIG. 15) may receive channel sweeping data from a control device included in a network, where the channel sweeping data indicates one or more frequency bands and one or more channels, as described above.

As further shown in FIG. 10, in some aspects, process 1000 may include transmitting channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data (block 1020). For example, the network node (e.g., using communication manager 1508 and/or transmission component 1504, depicted in FIG. 15) may transmit channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data, as described above.

As further shown in FIG. 10, in some aspects, process 1000 may include receiving location information associated with the user device based at least in part on transmitting the channel estimation data and the one or more time stamps (block 1030). For example, the network node (e.g., using communication manager 1508 and/or reception component 1502, depicted in FIG. 15) may receive location information associated with the user device based at least in part on transmitting the channel estimation data and the one or more time stamps, as described above.

Process 1000 may include additional aspects, such as any single aspect or any combination of aspects described below and/or in connection with one or more other processes described elsewhere herein.

In a first aspect, process 1000 includes transmitting an indication of traffic loads associated with the network node, where the channel sweeping data is received based at least in part on transmitting the indication of the traffic loads.

In a second aspect, alone or in combination with the first aspect, the indication of traffic loads includes information indicating whether a band associated with the network node is busy or idle.

In a third aspect, alone or in combination with one or more of the first and second aspects, process 1000 includes selecting one or more parameters associated with performing the channel sweeping process, where the one or more parameters include one or more of a type of channel sweeping, a quantity of channels, a time period between frames transmitted during the channel sweeping process, or a priority associated with the frames.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
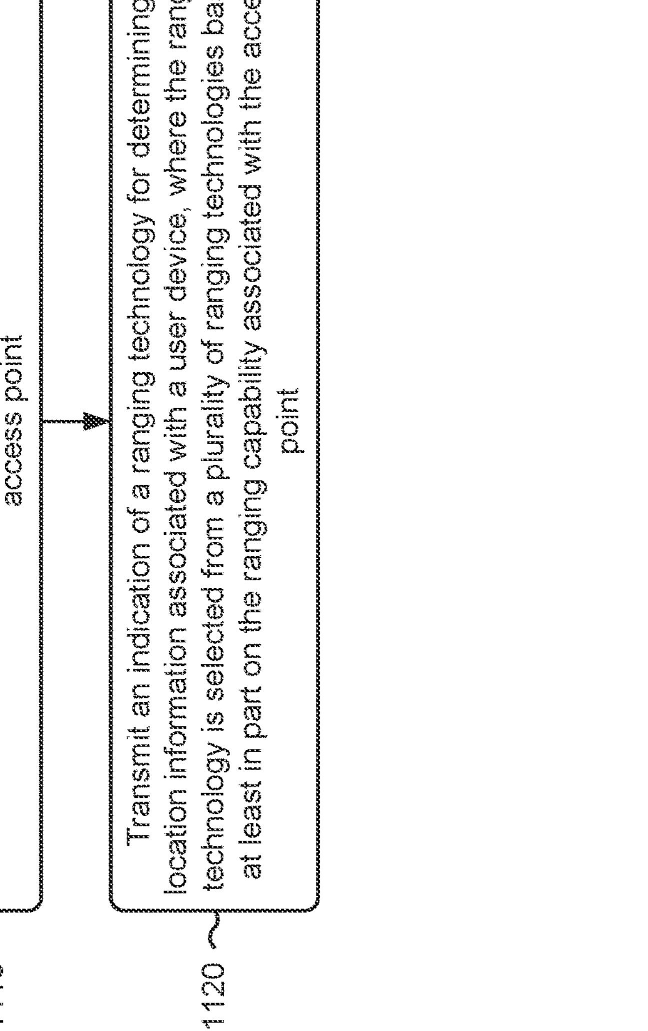

FIG. 11 is a diagram illustrating an example process 1100 performed, for example, by a network node, in accordance with the present disclosure. Example process 1100 is an example where the network node (e.g., the first network node 601, the base station or AP 110, and/or a component of the base station or AP 110) performs operations associated with location as a service.

As shown in FIG. 11, in some aspects, process 1100 may include receiving an indication of a ranging capability associated with an access point (block 1110). For example, the network node (e.g., using communication manager 1608 and/or reception component 1602, depicted in FIG. 16) may receive an indication of a ranging capability associated with an access point, as described above.

As further shown in FIG. 11, in some aspects, process 1100 may include transmitting an indication of a ranging technology for determining location information associated with a user device, where the ranging technology is selected from a plurality of ranging technologies based at least in part on the ranging capability associated with the access point (block 1120). For example, the network node (e.g., using communication manager 1608 and/or transmission component 1604, depicted in FIG. 16) may transmit an indication of a ranging technology for determining location information associated with a user device, where the ranging technology is selected from a plurality of ranging technologies based at least in part on the ranging capability associated with the access point, as described above.

Process 1100 may include additional aspects, such as any single aspect or any combination of aspects described below and/or in connection with one or more other processes described elsewhere herein.

In a first aspect, the plurality of ranging technologies includes two or more of a single-sided RTT process, an 11mc two-sided RTT process, an 11az single unit ranging process, an 11az multiple unit ranging process, or an 11az passive ranging process.

In a second aspect, alone or in combination with the first aspect, process 1100 includes determining a characteristic of the user device, where the ranging technology is selected further based at least in part on the characteristic of the user device.

In a third aspect, alone or in combination with one or more of the first and second aspects, the characteristic of the user device includes one or more of a speed of the user device, a ranging technology associated with the user device, a key performance indicator associated with the user device, a security requirement associated with the user device, a maximum bandwidth associated with the user device, a quantity of channels associated with the user device, a quantity of streams associated with the user device, or a protocol supported by the user device.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
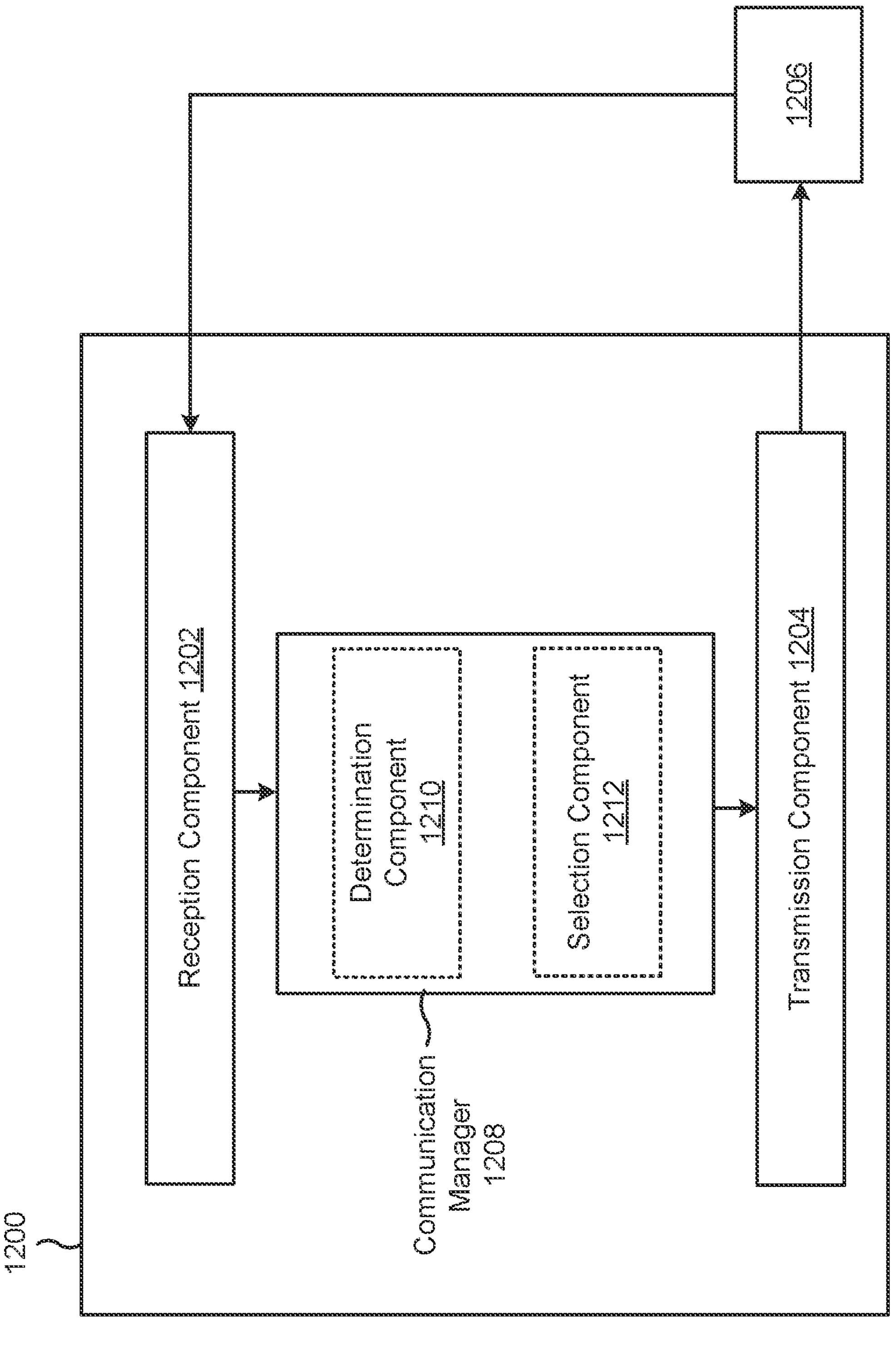
FIGS. 12-16 are diagrams of example apparatuses for wireless communication, in accordance with the present disclosure.

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208.

The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the base station described in connection with FIG. 2. The communication manager 1208 may be, or be similar to, the communication manager 140 depicted in FIGS. 1 and 2. For example, in some aspects, the communication manager 1208 may be configured to perform one or more of the functions described as being performed by the communication manager 140. In some aspects, the communication manager 1208 may include the reception component 1202 and/or the transmission component 1204. The communication manager 1208 may include one or more of a determination component 1210 and/or a selection component 1212, among other examples.

In some aspects, the apparatus 1200 may be configured to perform one or more operations described herein in connection with FIG. 4. Additionally, or alternatively, the apparatus 1200 may be configured to perform one or more processes described herein, such as process 700 of FIG. 7. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit an indication of a MAC address associated with an access point to a group of access points included in a network. The reception component 1202 may receive single-sided RTT data associated with a user device associated with the access point, where the single-sided RTT data is received from each of the group of access points based at least in part on transmitting the indication of the MAC address to the group of access points. The determination component 1210 may determine a location of the user device based at least in part on the single-sided RTT data. The transmission component 1204 may transmit an indication of the location of the user device to the access point. The selection component 1212 may select the group of access points from a plurality of access points included in the network based at least in part on one or more criteria.

The transmission component 1204 may transmit, to the group of access points, an indication of an order in which the group of access points are to perform a single-sided RTT process associated with obtaining the single-sided RTT data. The transmission component 1204 may transmit, to the group of access points, an indication of times at which each access point, of the group of access points, is to perform a single-sided RTT process associated with obtaining the single-sided RTT data.

The determination component 1210 may determine, based at least in part on the single-sided RTT data, an estimated turnaround time associated with the user device. The determination component 1210 may maintain a monotonicity of a sequence number associated with communications between the network and the user device.

The transmission component 1204 may transmit an indication of a most recent sequence number to a particular access point, of the group of access points, that is next to perform a single-sided RTT process to obtain the single-sided RTT data to maintain the monotonicity of the sequence number associated with the communications between the network and the user device.

The reception component 1202 may receive angle of arrival data associated with the user device associated with the access point, where the angle of arrival data is received from each of the group of access points. The determination component 1210 may determine the location of the user device further based at least in part on the angle of arrival data.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
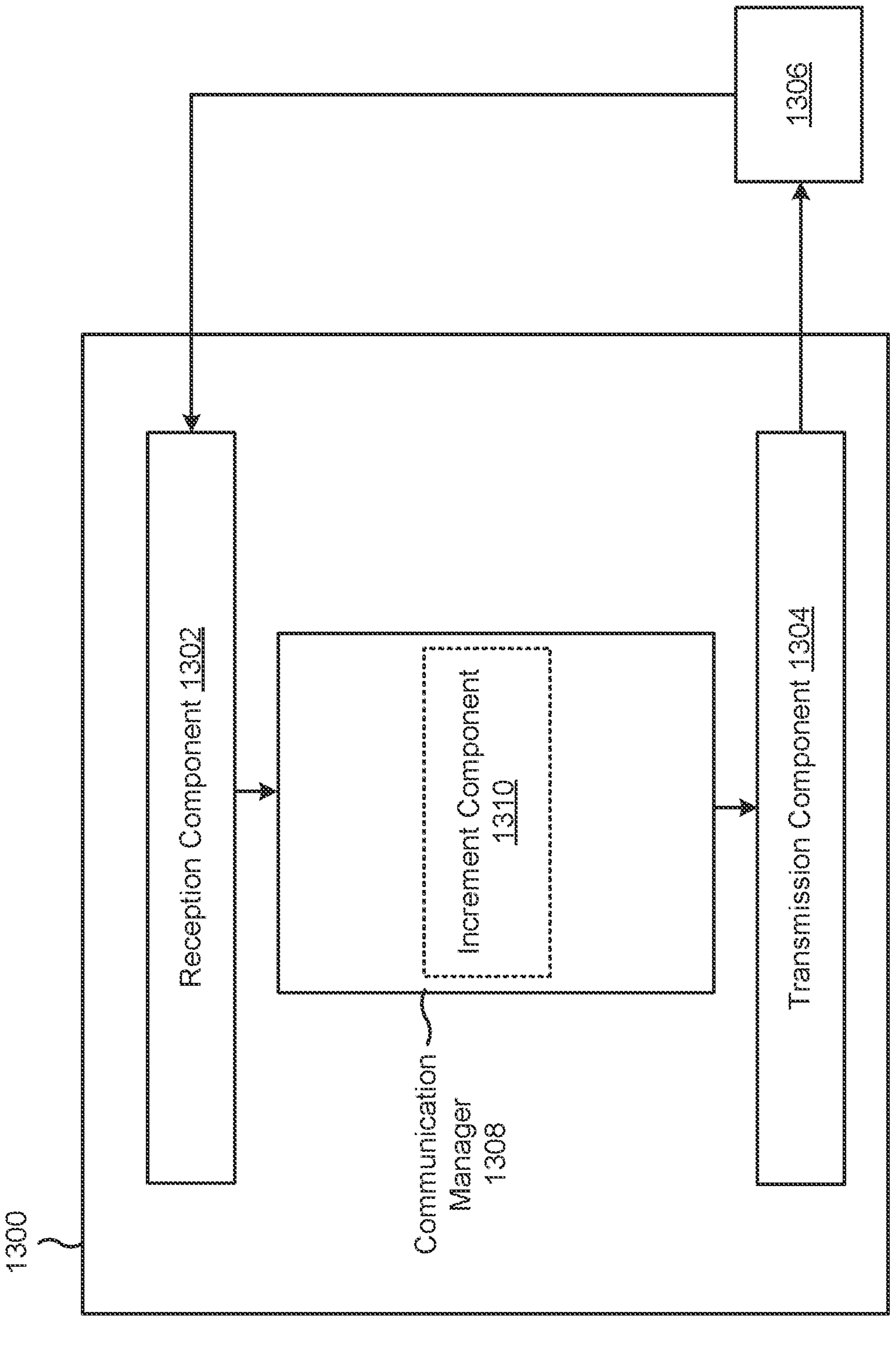

FIG. 13 is a diagram of an example apparatus 1300 for wireless communication. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308.

The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the base station described in connection with FIG. 2. The communication manager 1308 may be, or be similar to, the communication manager 140 depicted in FIGS. 1 and 2. For example, in some aspects, the communication manager 1308 may be configured to perform one or more of the functions described as being performed by the communication manager 140. In some aspects, the communication manager 1308 may include the reception component 1302 and/or the transmission component 1304. The communication manager 1308 may include an increment component 1310, among other examples.

In some aspects, the apparatus 1300 may be configured to perform one or more operations described herein in connection with FIG. 4. Additionally, or alternatively, the apparatus 1300 may be configured to perform one or more processes described herein, such as process 800 of FIG. 8. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The reception component 1302 may receive an indication of a MAC address associated with another network node. The transmission component 1304 may transmit a message to a user device, where the message includes the MAC address of the other network node. The reception component 1302 may receive a response from the user device. The transmission component 1304 may transmit single-sided RTT data to a control device, where the single-sided RTT data is determined based at least in part on transmitting the message and receiving the response.

The reception component 1302 may receive an indication of an order in which a group of network nodes are to perform a single-sided RTT process associated with obtaining the single-sided RTT data, where the network node is included in the group of network nodes, and where the message is transmitted to the user device according to the order.

The reception component 1302 may receive an indication of times at which each network node, of a group of network nodes, is to perform a single-sided RTT process associated with obtaining the single-sided RTT data, where the network node is included in the group of network nodes, and where the message is transmitted to the user device according to the indication of the times at which each network node, of the group of network nodes is to perform the single-sided RTT process.

The reception component 1302 may receive an indication of a sequence number associated with communications between the other network node and the user device. The increment component 1310 may increment the sequence number, where the message includes the incremented sequence number.

The transmission component 1304 may transmit angle of arrival data to the control device, wherein the angle of arrival data is determined based at least in part on receiving the response.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
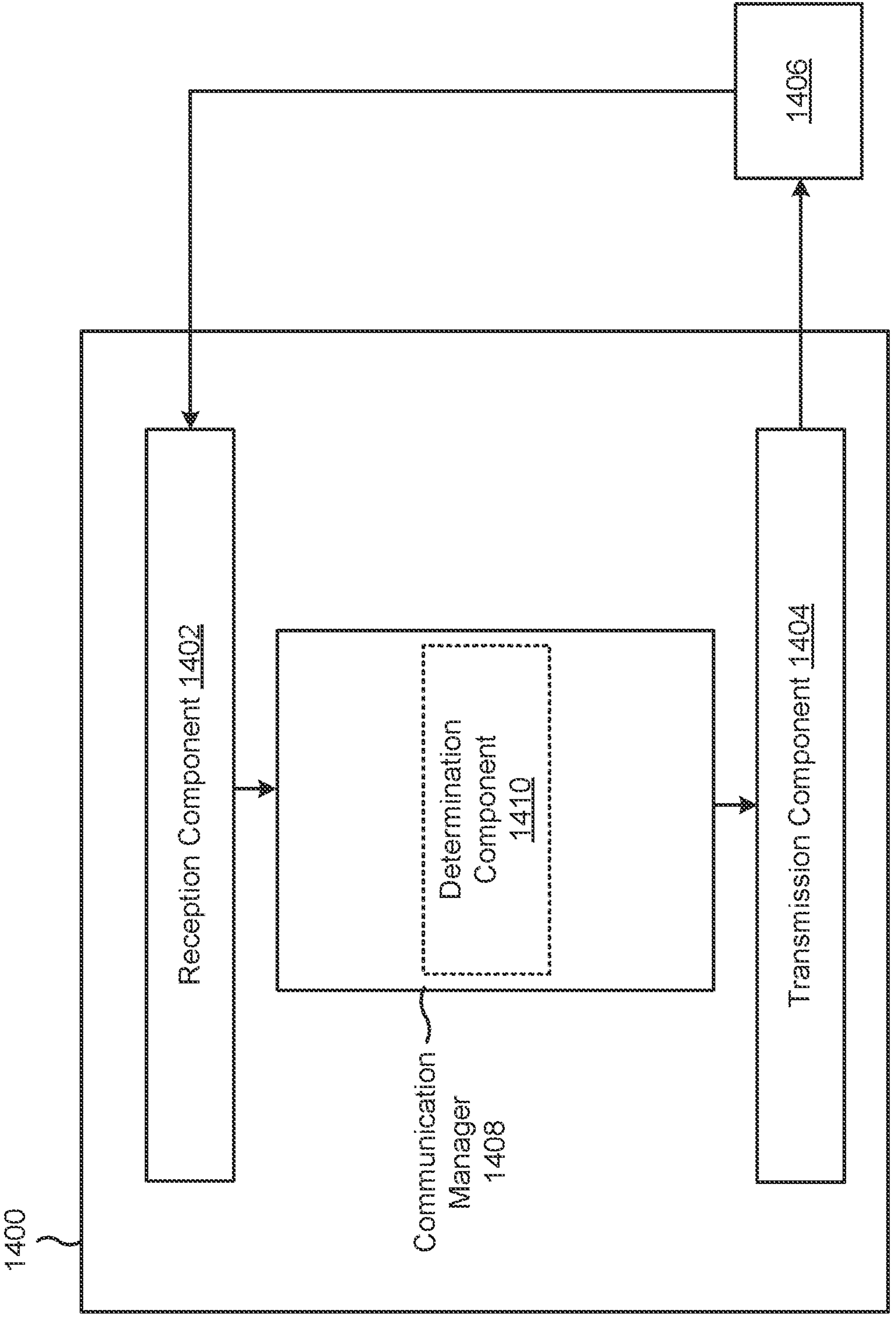

FIG. 14 is a diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408.

The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the base station described in connection with FIG. 2. The communication manager 1408 may be, or be similar to, the communication manager 140 depicted in FIGS. 1 and 2. For example, in some aspects, the communication manager 1408 may be configured to perform one or more of the functions described as being performed by the communication manager 140. In some aspects, the communication manager 1408 may include the reception component 1402 and/or the transmission component 1404. The communication manager 1408 may include a determination component 1410, among other examples.

In some aspects, the apparatus 1400 may be configured to perform one or more operations described herein in connection with FIG. 5. Additionally, or alternatively, the apparatus 1400 may be configured to perform one or more processes described herein, such as process 900 of FIG. 9. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit channel sweeping data to an access point included in a network, where the channel sweeping data indicates one or more frequency bands and one or more channels. The reception component 1402 may receive channel estimation data and one or more time stamps associated with the channel estimation data. The transmission component 1404 may transmit location information associated with a user device, where the location information is determined based at least in part on performing a channel stitching process, and where the channel stitching process is performed based at least in part the channel estimation data and the one or more time stamps.

The reception component 1402 may receive an indication of traffic loads associated with the network. The determination component 1410 may determine the channel sweeping data based at least in part on the traffic loads.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
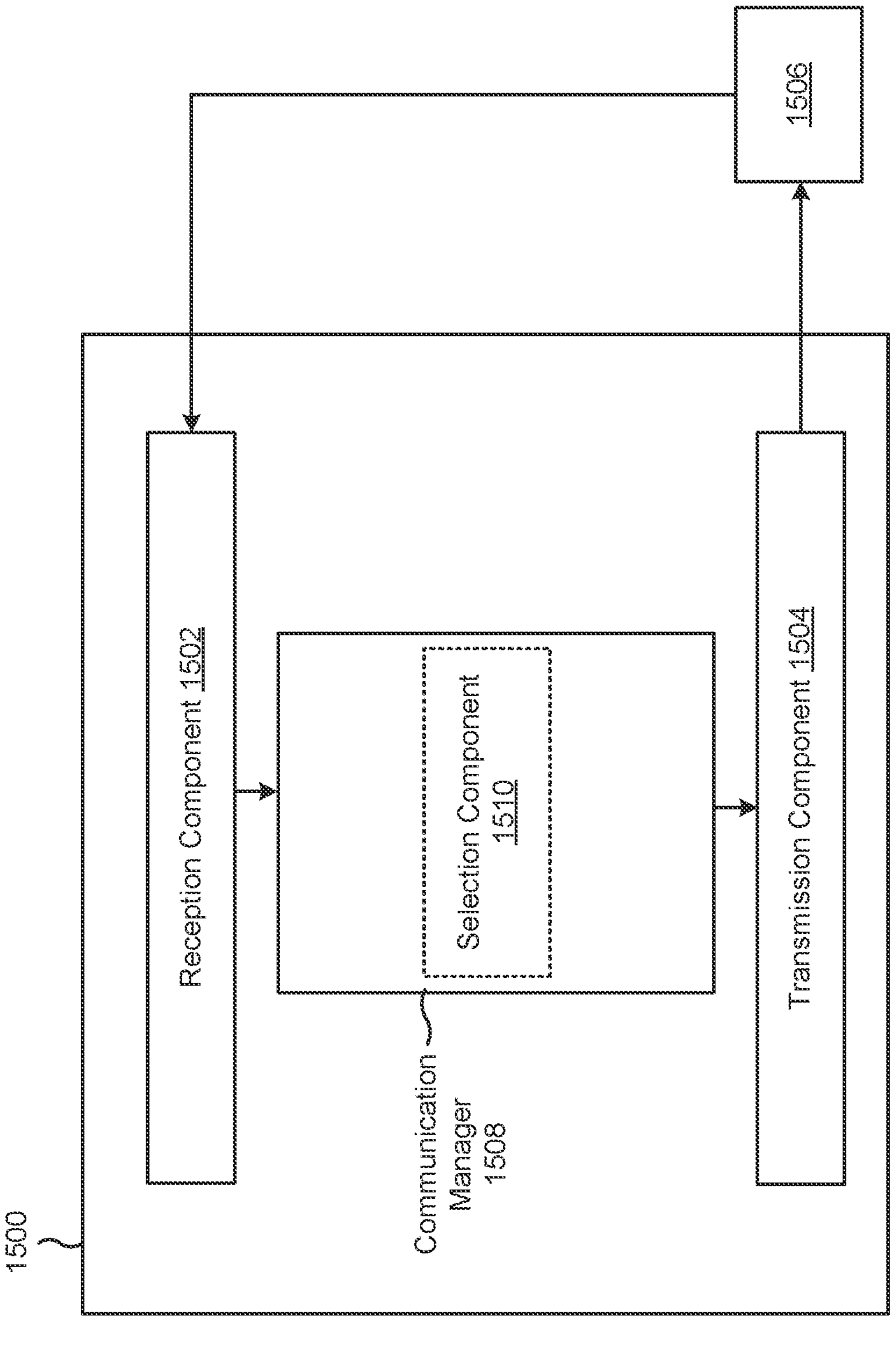

FIG. 15 is a diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508. The communication manager 1508 may include a selection component 1510, among other examples.

In some aspects, the apparatus 1500 may be configured to perform one or more operations described herein in connection with FIG. 5. Additionally, or alternatively, the apparatus 1500 may be configured to perform one or more processes described herein, such as process 1000 of FIG. 10. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The reception component 1502 may receive channel sweeping data from a control device included in a network, where the channel sweeping data indicates one or more frequency bands and one or more channels. The transmission component 1504 may transmit channel estimation data and one or more time stamps associated with the channel estimation data to the control device, where the channel estimation data and the one or more time stamps are determined based at least in part on performing a channel sweeping process associated with a user device, and where the channel sweeping process is performed based at least in part on the channel sweeping data. The reception component 1502 may receive location information associated with the user device based at least in part on transmitting the channel estimation data and the one or more time stamps.

The transmission component 1504 may transmit an indication of traffic loads associated with the network node, where the channel sweeping data is received based at least in part on transmitting the indication of the traffic loads.

The selection component 1510 may select one or more parameters associated with performing the channel sweeping process, where the one or more parameters include one or more of a type of channel sweeping, a quantity of channels, a time period between frames transmitted during the channel sweeping process, or a priority associated with the frames.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
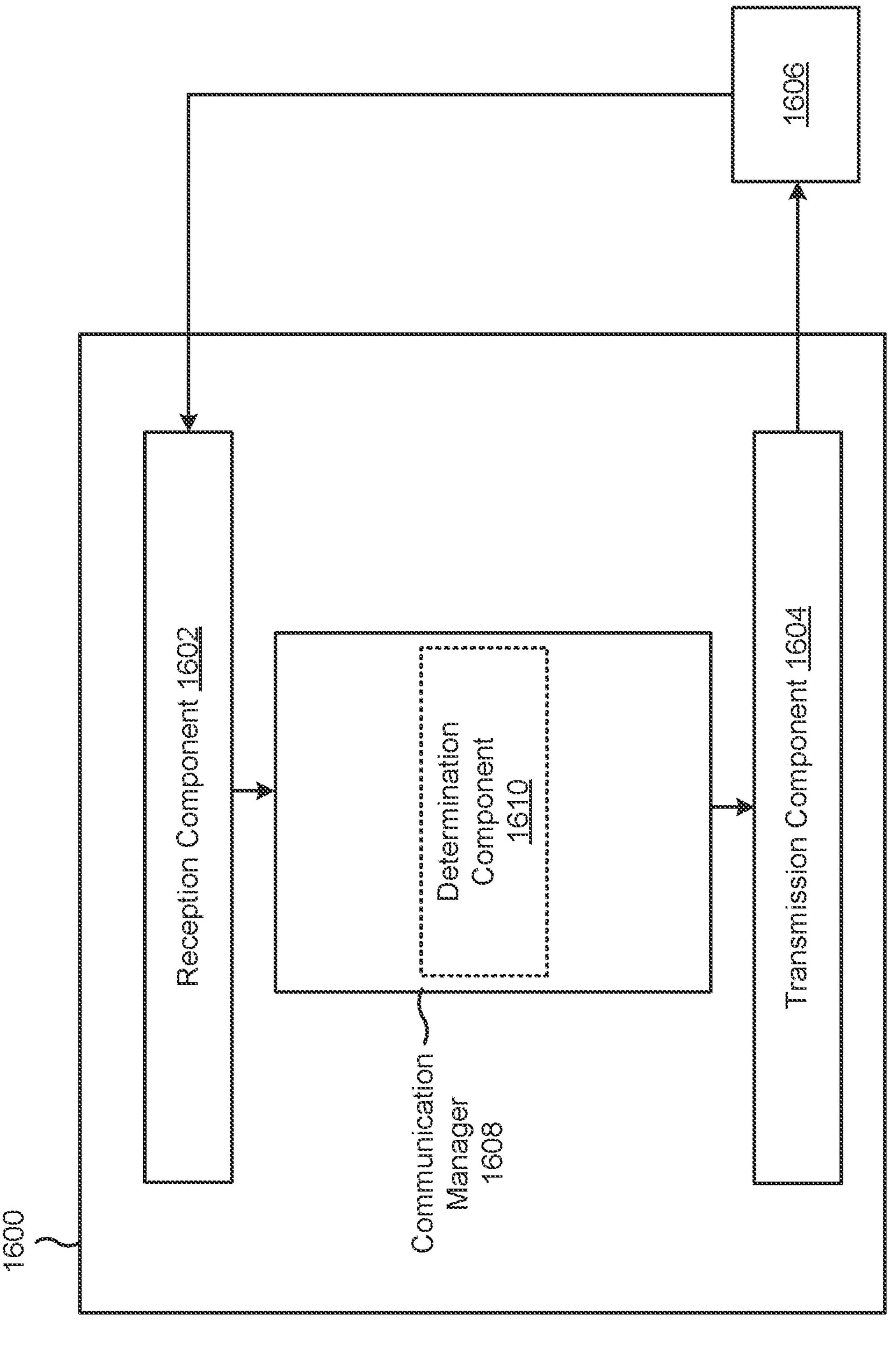

FIG. 16 is a diagram of an example apparatus 1600 for wireless communication. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 1608.

The communication manager 1608 may control and/or otherwise manage one or more operations of the reception component 1602 and/or the transmission component 1604. In some aspects, the communication manager 1608 may include one or more antennas, a modem, a controller/processor, a memory, or a combination thereof, of the base station described in connection with FIG. 2. The communication manager 1608 may be, or be similar to, the communication manager 140 depicted in FIGS. 1 and 2. For example, in some aspects, the communication manager 1608 may be configured to perform one or more of the functions described as being performed by the communication manager 140. In some aspects, the communication manager 1608 may include the reception component 1602 and/or the transmission component 1604. The communication manager 1608 may include a determination component 1610, among other examples.

In some aspects, the apparatus 1600 may be configured to perform one or more operations described herein in connection with FIG. 6. Additionally, or alternatively, the apparatus 1600 may be configured to perform one or more processes described herein, such as process 1100 of FIG. 11. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The reception component 1602 may receive an indication of a ranging capability associated with an access point. The transmission component 1604 may transmit an indication of a ranging technology for determining location information associated with a user device, where the ranging technology is selected from a plurality of ranging technologies based at least in part on the ranging capability associated with the access point.

The determination component 1610 may determine a characteristic of the user device, where the ranging technology is selected further based at least in part on the characteristic of the user device.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a network node, comprising: transmitting an indication of a MAC address associated with an access point to a group of access points included in a network; receiving single-sided RTT data associated with a user device associated with the access point, wherein the single-sided RTT data is received from each of the group of access points based at least in part on transmitting the indication of the MAC address to the group of access points; determining a location of the user device based at least in part on the single-sided RTT data; and transmitting an indication of the location of the user device to the access point.

Aspect 2: The method of Aspect 1, further comprising: selecting the group of access points from a plurality of access points included in the network based at least in part on one or more criteria.

Aspect 3: The method of one or more of Aspects 1 and 2, further comprising: transmitting, to the group of access points, an indication of an order in which the group of access points are to perform a single-sided RTT process associated with obtaining the single-sided RTT data.

Aspect 4: The method of one or more of Aspects 1 through 3, further comprising: transmitting, to the group of access points, an indication of times at which each access point, of the group of access points, is to perform a single-sided RTT process associated with obtaining the single-sided RTT data.

Aspect 5: The method of one or more of Aspects 1 through 4, further comprising: determining, based at least in part on the single-sided RTT data, an estimated turnaround time associated with the user device.

Aspect 6: The method of one or more of Aspects 1 through 5, further comprising: maintaining a monotonicity of a sequence number associated with communications between the network and the user device.

Aspect 7: The method of Aspect 6, further comprising: transmitting an indication of a most recent sequence number to a particular access point, of the group of access points, that is next to perform a single-sided RTT process to obtain the single-sided RTT data to maintain the monotonicity of the sequence number associated with the communications between the network and the user device.

Aspect 8: The method of one or more of Aspects 1 through 7, further comprising: receiving angle of arrival data associated with the user device associated with the access point, wherein the angle of arrival data is received from each of the group of access points; and determining the location of the user device further based at least in part on the angle of arrival data.

Aspect 9: A method of wireless communication performed by a network node, comprising: receiving an indication of a MAC address associated with another network node; transmitting a message to a user device, wherein the message includes the MAC address of the other network node; receiving a response from the user device; and transmitting single-sided RTT data to a control device, wherein the single-sided RTT data is determined based at least in part on transmitting the message and receiving the response.

Aspect 10: The method of Aspect 9, further comprising: receiving an indication of an order in which a group of network nodes are to perform a single-sided RTT process associated with obtaining the single-sided RTT data, wherein the network node is included in the group of network nodes, and wherein the message is transmitted to the user device according to the order.

Aspect 11: The method of one or more of Aspects 9 and 10, further comprising: receiving an indication of times at which each network node, of a group of network nodes, is to perform a single-sided RTT process associated with obtaining the single-sided RTT data, wherein the network node is included in the group of network nodes, and wherein the message is transmitted to the user device according to the indication of the times at which each network node, of the group of network nodes is to perform the single-sided RTT process.

Aspect 12: The method of one or more of Aspects 9 through 11, further comprising: receiving an indication of a sequence number associated with communications between the other network node and the user device; and incrementing the sequence number, wherein the message includes the incremented sequence number.

Aspect 13: The method of one or more of Aspects 9 through 12, further comprising transmitting angle of arrival data to the control device, wherein the angle of arrival data is determined based at least in part on receiving the response.

Aspect 14: A method of wireless communication performed by a network node, comprising: transmitting channel sweeping data to an access point included in a network, wherein the channel sweeping data indicates one or more frequency bands and one or more channels; receiving channel estimation data and one or more time stamps associated with the channel estimation data; and transmitting location information associated with a user device, wherein the location information is determined based at least in part on performing a channel stitching process, and wherein the channel stitching process is performed based at least in part the channel estimation data and the one or more time stamps.

Aspect 15: The method of Aspect 14, further comprising: receiving an indication of traffic loads associated with the network; and determining the channel sweeping data based at least in part on the traffic loads.

Aspect 16: A method of wireless communication performed by a network node, comprising: receiving channel sweeping data from a control device included in a network, wherein the channel sweeping data indicates one or more frequency bands and one or more channels; transmitting channel estimation data and one or more time stamps associated with the channel estimation data to the control device, wherein the channel estimation data and the one or more time stamps are determined based at least in part on performing a channel sweeping process associated with a user device, and wherein the channel sweeping process is performed based at least in part on the channel sweeping data; and receiving location information associated with the user device based at least in part on transmitting the channel estimation data and the one or more time stamps.

Aspect 17: The method of Aspect 16, further comprising: transmitting an indication of traffic loads associated with the network node, wherein the channel sweeping data is received based at least in part on transmitting the indication of the traffic loads.

Aspect 18: The method of Aspect 17, wherein the indication of traffic loads includes information indicating whether a band associated with the network node is busy or idle.

Aspect 19: The method of one or more of Aspects 16 through 18, further comprising: selecting one or more parameters associated with performing the channel sweeping process, wherein the one or more parameters include one or more of a type of channel sweeping, a quantity of channels, a time period between frames transmitted during the channel sweeping process, or a priority associated with the frames.

Aspect 20: A method of wireless communication performed by a network node, comprising: receiving an indication of a ranging capability associated with an access point; and transmitting an indication of a ranging technology for determining location information associated with a user device, wherein the ranging technology is selected from a plurality of ranging technologies based at least in part on the ranging capability associated with the access point.

Aspect 21: The method of Aspect 20, wherein the plurality of ranging technologies includes two or more of a single-sided RTT process, an Institute of Electrical and Electronics Engineers (IEEE) 802.11mc Fine Timing Measurement based two-sided RTT process, an IEEE 802.11az non-trigger based single user ranging process, an IEEE 802.11az trigger based multiple user ranging process, or an IEEE 802.11az passive trigger based ranging process.

Aspect 22: The method of one or more of Aspects 20 and 21, further comprising: determining a characteristic of the user device, wherein the ranging technology is selected further based at least in part on the characteristic of the user device.

Aspect 23: The method of Aspect 22, wherein the characteristic of the user device includes one or more of a speed of the user device, a ranging technology associated with the user device, a key performance indicator associated with the user device, a security requirement associated with the user device, a maximum bandwidth associated with the user device, a quantity of channels associated with the user device, a quantity of streams associated with the user device, or a protocol supported by the user device.

Aspect 24: An apparatus for wireless communication at a device, comprising a processor; memory coupled with the processor; and instructions stored in the memory and executable by the processor to cause the apparatus to perform the method of one or more of Aspects 1 through 8.

Aspect 25: A device for wireless communication, comprising a memory and one or more processors coupled to the memory, the one or more processors configured to perform the method of one or more of Aspects 1 through 8.

Aspect 26: An apparatus for wireless communication, comprising at least one means for performing the method of one or more of Aspects 1 through 8.

Aspect 27: A non-transitory computer-readable medium storing code for wireless communication, the code comprising instructions executable by a processor to perform the method of one or more of Aspects 1 through 8.

Aspect 28: A non-transitory computer-readable medium storing a set of instructions for wireless communication, the set of instructions comprising one or more instructions that, when executed by one or more processors of a device, cause the device to perform the method of one or more of Aspects 1 through 8.

Aspect 29: An apparatus for wireless communication at a device, comprising a processor; memory coupled with the processor; and instructions stored in the memory and executable by the processor to cause the apparatus to perform the method of one or more of Aspects 9 through 13.

Aspect 30: A device for wireless communication, comprising a memory and one or more processors coupled to the memory, the one or more processors configured to perform the method of one or more of Aspects 9 through 13.

Aspect 31: An apparatus for wireless communication, comprising at least one means for performing the method of one or more of Aspects 9 through 13.

Aspect 32: A non-transitory computer-readable medium storing code for wireless communication, the code comprising instructions executable by a processor to perform the method of one or more of Aspects 9 through 13.

Aspect 33: A non-transitory computer-readable medium storing a set of instructions for wireless communication, the set of instructions comprising one or more instructions that, when executed by one or more processors of a device, cause the device to perform the method of one or more of Aspects 9 through 13.

Aspect 34: An apparatus for wireless communication at a device, comprising a processor; memory coupled with the processor; and instructions stored in the memory and executable by the processor to cause the apparatus to perform the method of one or more of Aspects 14 and 15.

Aspect 35: A device for wireless communication, comprising a memory and one or more processors coupled to the memory, the one or more processors configured to perform the method of one or more of Aspects 14 and 15.

Aspect 36: An apparatus for wireless communication, comprising at least one means for performing the method of one or more of Aspects 14 and 15.

Aspect 37: A non-transitory computer-readable medium storing code for wireless communication, the code comprising instructions executable by a processor to perform the method of one or more of Aspects 14 and 15.

Aspect 38: A non-transitory computer-readable medium storing a set of instructions for wireless communication, the set of instructions comprising one or more instructions that, when executed by one or more processors of a device, cause the device to perform the method of one or more of Aspects 14 and 15.

Aspect 39: An apparatus for wireless communication at a device, comprising a processor; memory coupled with the processor; and instructions stored in the memory and executable by the processor to cause the apparatus to perform the method of one or more of Aspects 16 through 19.

Aspect 40: A device for wireless communication, comprising a memory and one or more processors coupled to the memory, the one or more processors configured to perform the method of one or more of Aspects 16 through 19.

Aspect 41: An apparatus for wireless communication, comprising at least one means for performing the method of one or more of Aspects 16 through 19.

Aspect 42: A non-transitory computer-readable medium storing code for wireless communication, the code comprising instructions executable by a processor to perform the method of one or more of Aspects 16 through 19.

Aspect 43: A non-transitory computer-readable medium storing a set of instructions for wireless communication, the set of instructions comprising one or more instructions that, when executed by one or more processors of a device, cause the device to perform the method of one or more of Aspects 16 through 19.

Aspect 44: An apparatus for wireless communication at a device, comprising a processor; memory coupled with the processor; and instructions stored in the memory and executable by the processor to cause the apparatus to perform the method of one or more of Aspects 20 through 23.

Aspect 45: A device for wireless communication, comprising a memory and one or more processors coupled to the memory, the one or more processors configured to perform the method of one or more of Aspects 20 through 23.

Aspect 46: An apparatus for wireless communication, comprising at least one means for performing the method of one or more of Aspects 20 through 23.

Aspect 47: A non-transitory computer-readable medium storing code for wireless communication, the code comprising instructions executable by a processor to perform the method of one or more of Aspects 20 through 23.

Aspect 48: A non-transitory computer-readable medium storing a set of instructions for wireless communication, the set of instructions comprising one or more instructions that, when executed by one or more processors of a device, cause the device to perform the method of one or more of Aspects 20 through 23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:

a memory; and one or more processors, coupled to the memory, configured to:

transmit an indication of a media access control (MAC) address associated with an access point to a group of access points included in a network;

receive single-sided round-trip-time (RTT) data associated with a user device associated with the access point, wherein the single-sided RTT data is received from each of the group of access points based at least in part on transmitting the indication of the MAC address to the group of access points;

determine a location of the user device based at least in part on the single-sided RTT data;

transmit an indication of the location of the user device to the access point; and transmit, to the group of access points, an indication of times at which each access point, of the group of access points, is to perform a single-sided RTT process associated with obtaining the single-sided RTT data.

2. The network node of claim 1, wherein the one or more processors are configured to select the group of access points from a plurality of access points included in the network based at least in part on one or more criteria.

3. The network node of claim 1, wherein the one or more processors are configured to transmit, to the group of access points, an indication of an order in which the group of access points are to perform a single-sided RTT process associated with obtaining the single-sided RTT data.

4. The network node of claim 1, wherein the one or more processors are configured to determine, based at least in part on the single-sided RTT data, an estimated turnaround time associated with the user device.

5. The network node of claim 1, wherein the one or more processors are configured to maintain a monotonicity of a sequence number associated with communications between the network and the user device.

6. The network node of claim 5, wherein the one or more processors are configured to transmit an indication of a most recent sequence number to a particular access point, of the group of access points, that is next to perform a single-sided RTT process to obtain the single-sided RTT data to maintain the monotonicity of the sequence number associated with the communications between the network and the user device.

7. The network node of claim 1, wherein the one or more processors are configured to:

receive angle of arrival data associated with the user device associated with the access point, wherein the angle of arrival data is received from each of the group of access points; and determine the location of the user device further based at least in part on the angle of arrival data.

8. A network node for wireless communication, comprising:

a memory; and one or more processors, coupled to the memory, configured to:

receive an indication of a media access control (MAC) address associated with another network node;

transmit a message to a user device, wherein the message includes the MAC address of the other network node;

receive a response from the user device;

transmit single-sided round-trip-time (RTT) data to a control device, wherein the single-sided RTT data is determined based at least in part on transmitting the message and receiving the response; and receive an indication of times at which each network node, of a group of network nodes, is to perform a single-sided RTT process associated with obtaining the single-sided RTT data, wherein the network node is included in the group of network nodes, and wherein the message is transmitted to the user device according to the indication of the times at which each network node, of the group of network nodes, is to perform the single-sided RTT process.

9. The network node of claim 8, wherein the one or more processors are configured to receive an indication of an order in which a group of network nodes are to perform a single-sided RTT process associated with obtaining the single-sided RTT data, wherein the network node is included in the group of network nodes, and wherein the message is transmitted to the user device according to the order.

10. The network node of claim 8, wherein the one or more processors are configured to:

receive an indication of a sequence number associated with communications between the other network node and the user device; and increment the sequence number, wherein the message includes the incremented sequence number.

11. The network node of claim 8, wherein the one or more processors are configured to transmit angle of arrival data to the control device, wherein the angle of arrival data is determined based at least in part on receiving the response.

12. A method of wireless communication performed by a network node, comprising:

transmitting an indication of a media access control (MAC) address associated with an access point to a group of access points included in a network;

receiving single-sided round-trip-time (RTT) data associated with a user device associated with the access point, wherein the single-sided RTT data is received from each of the group of access points based at least in part on transmitting the indication of the MAC address to the group of access points;

determining a location of the user device based at least in part on the single-sided RTT data;

transmitting an indication of the location of the user device to the access point; and transmitting, to the group of access points, an indication of times at which each access point, of the group of access points, is to perform a single-sided RTT process associated with obtaining the single-sided RTT data.

13. The method of claim 12, comprising selecting the group of access points from a plurality of access points included in the network based at least in part on one or more criteria.

14. The method of claim 12, comprising transmitting, to the group of access points, an indication of an order in which the group of access points are to perform a single-sided RTT process associated with obtaining the single-sided RTT data.

15. The method of claim 12, comprising determining, based at least in part on the single-sided RTT data, an estimated turnaround time associated with the user device.

16. The method of claim 12, comprising maintaining a monotonicity of a sequence number associated with communications between the network and the user device.

17. The method of claim 16, comprising transmitting an indication of a most recent sequence number to a particular access point, of the group of access points, that is next to perform a single-sided RTT process to obtain the single-sided RTT data to maintain the monotonicity of the sequence number associated with the communications between the network and the user device.

18. The method of claim 12, comprising:

receiving angle of arrival data associated with the user device associated with the access point, wherein the angle of arrival data is received from each of the group of access points; and determining the location of the user device further based at least in part on the angle of arrival data.

19. A method of wireless communication performed by a network node, comprising:

receiving an indication of a media access control (MAC) address associated with another network node;

transmitting a message to a user device, wherein the message includes the MAC address of the other network node;

receiving a response from the user device;

transmitting single-sided round-trip-time (RTT) data to a control device, wherein the single-sided RTT data is determined based at least in part on transmitting the message and receiving the response; and receiving an indication of times at which each network node, of a group of network nodes, is to perform a single-sided RTT process associated with obtaining the single-sided RTT data, wherein the network node is included in the group of network nodes, and wherein the message is transmitted to the user device according to the indication of the times at which each network node, of the group of network nodes, is to perform the single-sided RTT process.

20. The method of claim 19, further comprising:

receiving an indication of an order in which a group of network nodes are to perform a single-sided RTT process associated with obtaining the single-sided RTT data, wherein the network node is included in the group of network nodes, and wherein the message is transmitted to the user device according to the order.

* * * * *